United States Patent
Sakai

(12) United States Patent (10) Patent No.: US 7,455,920 B2
Sakai (45) Date of Patent: Nov. 25, 2008

(54) FUEL CELL SYSTEM

(75) Inventor: Hiromasa Sakai, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 597 days.

(21) Appl. No.: 10/533,431

(22) PCT Filed: Dec. 1, 2003

(86) PCT No.: PCT/JP03/15325

§ 371 (c)(1),
(2), (4) Date: May 2, 2005

(87) PCT Pub. No.: WO2004/051779

PCT Pub. Date: Jun. 17, 2004

(65) Prior Publication Data

US 2006/0035120 A1 Feb. 16, 2006

(30) Foreign Application Priority Data

Dec. 3, 2002 (JP) ............................... 2002-351174

(51) Int. Cl.
*H01M 8/04* (2006.01)

(52) U.S. Cl. ............................... 429/13; 429/24; 429/25

(58) Field of Classification Search .................. 429/13, 429/22, 23, 24, 25
See application file for complete search history.

(56) References Cited

U.S. PATENT DOCUMENTS

2001/0001287 A1 5/2001 Ueno et al.
2001/0021468 A1 9/2001 Kanai et al.
2002/0071972 A1 6/2002 Gebhardt et al.
2002/0098396 A1 7/2002 Kobayashi et al.
2003/0219638 A1* 11/2003 Tanaka et al. ............. 429/22 X
2006/0228597 A1* 10/2006 Mossman .................... 429/13

FOREIGN PATENT DOCUMENTS

| JP | 11-317236 | 11/1999 |
| JP | 2000-243418 | 9/2000 |
| JP | 2001-256989 | 9/2001 |
| WO | WO 00/65676 | 11/2000 |

OTHER PUBLICATIONS

Korean Office Action issued in corresponding Korean Patent Application No. KR 10-2005-7010001, dated Sep. 27, 2006.

* cited by examiner

*Primary Examiner*—Stephen J. Kalafut
(74) *Attorney, Agent, or Firm*—McDermott Will & Emery LLP

(57) ABSTRACT

The fuel cell system comprises a fuel cell (1) that has an electrolyte membrane and generates power by using a fuel gas and an oxidizing agent gas; a storage device (51) for water that humidifies the fuel cell; and a controller (100). The controller (100) judges whether the fuel cell (1) can be humidified by using the water of the storage device (51), and limits the operating temperature of the fuel cell (1) to below a limit temperature that is lower than during normal operation in a case where it is judged that the fuel cell (1) cannot be humidified.

14 Claims, 22 Drawing Sheets

FUEL CELL SYSTEM

FIELD OF THE INVENTION

This invention relates to a fuel cell system, and, more particularly, to a technology for suppressing deterioration of a fuel cell which is caused by a water shortage of the fuel cell system.

BACKGROUND OF THE INVENTION

In a solid polymer electrolyte fuel cell system, the proton-exchange membrane must be maintained in a saturated hydrous state by supplying water to the fuel cell, in order to ensure the proton conductivity electrolyte function. As one method for securing the water for hydration of the proton-exchange membrane, there is a method that provides a water-permeable humidifier that humidifies the gas supplied to the fuel cell by recovering the moisture in the discharge gas of the fuel cell.

The fuel cell disclosed by JP2001-256989A, which was published by the Japan Patent Office in 2001, comprises, in addition to a water-permeable humidifier, a water recovery device for recovering water in the fuel cell discharge gas, and auxiliary humidification means for humidifying the supply gas by means of the recovered water thus recovered by the water recovery device. The water recovery device is constituted by a vapor separation device and a recovered water storage tank, and the auxiliary humidification means are constituted by a check valve, a recovered water supply pump, auxiliary humidification piping, and an injector, and so forth. During startup of the fuel cell, the recovered water in the recovered water storage tank is transferred by means of a recovered water supply pump, injected in the form of a mist by the injector, and then supplied to the gas supply side of the fuel cell. The proton-exchange membrane can thus also be humidified during startup of the fuel cell.

SUMMARY OF THE INVENTION

However, in a conventional fuel cell system, a considerable amount of electrical power is required in order to prevent freezing in the storage tank and the like in cold regions, and there is the possibility that the battery will run out when there is no external power supply. In addition, also in a case where the temperature is not maintained and ice in the storage tank thaws during startup, an extremely large amount of electrical energy is required, and power must be generated by the fuel cell, whereby fuel resources are depleted by the electrical power increase.

Accordingly, an object of this invention is to provide a fuel cell system that permits a rapid startup while making it possible to prevent failure caused by a humidification shortage of the fuel cell (dryout) in a low temperature environment in which there is the possibly of the water in the fuel cell system freezing.

In order to achieve the above object, the present invention provides a fuel cells comprising a fuel cell that has an electrolyte membrane and generates power by using a fuel gas and an oxidizing agent gas, a storage device for water that humidifies the fuel cell, and a controller that functions to judge whether the fuel cell can be humidified by using the water of the storage device, and limit the operating temperature of the fuel cell to below a limit temperature that is lower than during normal operation in a case where it is judged that the fuel cell cannot be humidified.

The details as well as other features and advantages of this invention are set fort in the remainder of the specification and are shown in the accompanying drawings.

DESCRIPTION OF THE PREFERRED EMBODIMENTS

First Embodiment

Figure 1:
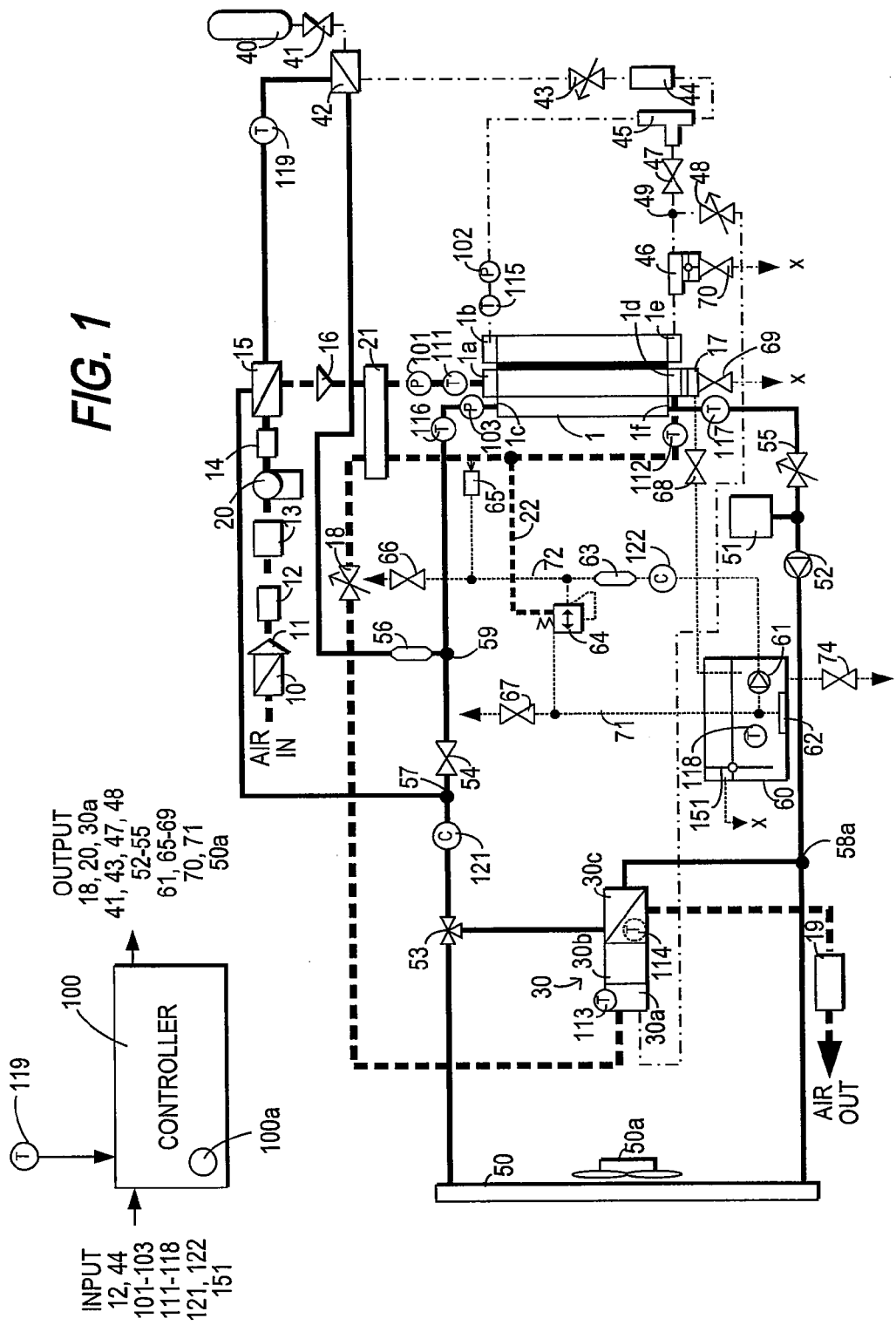
FIG. 1 is a constitutional view of the fuel cell system according to his invention.

FIG. 1 shows a first embodiment of the fuel cell system according to this invention. The fuel cell system is a solid polymer electrolyte fuel cell system, and, when it is predicted that there is the possibility of purified water in a water tank 60 (described later) freezing during stoppage, the fuel cell system prevents the freezing of water by discharging the water in the water tank 60. The following description is provided with respect to a case where this system is utilized as the drive source of a vehicle.

The system comprises a fuel cell 1 that generates power by supplying an oxidizing agent to the cathode and fuel gas to the anode. Here, air is supplied as the oxidizing agent and hydrogen as the fuel gas, but this invention is not restricted to such usage.

Fist of all, an oxidizing agent system that supplies and discharges air to and from the cathode will be described.

The oxidizing agent system comprises a compressor 20 for introducing air to the fuel cell system. An air cleaner 10, a chemical filter 11, a flow meter 12, and a silencer 13 are provided on the intake side of the compressor 20, and a silencer 14, an air temperature regulator 15, and a microfilter 16, are provided on the discharge side. In addition, a Water Recovery Device (WRD) 21, which humidifies the air supplied to a fuel cell 1, is provided. The WRD 21 is the main humidification means comprising a humidified side where the gas to be humidified flows and a humidifying side where the hydrous gas constituting the humidification source flows. Humidification is performed by causing the air introduced by the compressor 20 to flow through to the humidified side of the WRD 21 and by using the cathode discharge gas from the fuel cell 1 as will be described subsequently. The humidified air is introduced to the fuel cell 1 via a cathode inlet manifold 1a with which the cathode of the fuel cell 1 is provided. A pressure sensor 101 and a temperature sensor 111 are provided between the WRD 21 and the fuel cell 1 to detect the pressure and temperature of the air supplied to the fuel cell 1.

Water is produced by the power generation reaction ($\frac{1}{2}O_2$+ $2H^+ + 2e^- \rightarrow H_2O$) at the cathode. A cathode outlet manifold 1d is provided with a water separator 17 and recovers the water produced at the cathode. In addition, the temperature of the cathode discharge gas is detected by the temperature sensor 112.

The cathode discharge gas thus discharged by the cathode outlet manifold 1d passes through the humidifying side of the WRD 21. As described earlier, in flowing through the humidifying side the WRD 21, the cathode discharge gas humidifies the air passing through the humidified side. At such time, when the moisture contained in the cathode discharge gas is insufficient, the air cannot be adequately humidified. Therefore, a water injector 65, and a supply pressure control valve (PRV) 64 for regulating the amount of water sprayed by the water injector 65 are provided as auxiliary humidification means. The water injector 65 sprays water into the cathode discharge gas upstream of the humidifying side of the WRD 21. The PRV 64 regulates the pressure applied to the water injector 65 in accordance with the state of the cathode discharge gas and thus regulates the flow rate of the water sprayed by the water injector 65. Piping 22, which extends from a position upstream on the humidifying side of the WED 21 to the PRV 64, is provided, and the PRV 64 is regulated with the pressure of the cathode discharge gas serving as a reference pressure.

A combustion chamber heat exchanger ASSY (combustion device) 30 is provided downstream on the humidifying side of the WRD 21. A pressure control value (PCV) 18, which regulates the pressure of the cathode, is provided between the WRD 21 and the combustion device 30. The combustion device 30 comprises an electrically heated catalyst (EHC) 30a, a catalytic converter (CAT) 30b, and a heat exchanger (HE) 30c. The cathode discharge gas is used for the combustion in the combustion device 30 and then discharged to the outside via a muffler 19. Further, the EHC 30a is provided with a temperature sensor 113, and a temperature sensor 114 is provided at the outlet of the HE 30c.

Meanwhile, a hydrogen system for supplying and discharging hydrogen to the anode is constituted as below.

A hydrogen system comprises a hydrogen tank 40 for storing hydrogen; a shutoff valve 41 for shutting off the supply of hydrogen from the hydrogen tank 40; a hydrogen temperature regulator 42 for regulating the temperature of the supplied hydrogen by using a coolant (described subsequently); a pressure control valve (PV) 43 for regulating the hydrogen gas pressure; and a flow meter 44 that detects the flow rate of hydrogen gas. The hydrogen gas, whose temperature and pressure have been thus regulated, is supplied to a fuel cell 1 via an injector 45 for re-circulating an anode discharge gas as will be described subsequently.

Hydrogen gas is introduced to the fuel cell 1 via an anode inlet manifold 1b with which the anode is provided. A pressure sensor 102 and a temperature sensor 115 are provided on the upstream side of the anode to detect the pressure and temperature of the supplied hydrogen gas. The hydrogen gas thus supplied to the anode is used and thus consumed in the power generation reaction ($H_2 \rightarrow 2H^+ + 2e^-$). This does not mean that all the hydrogen gas is consumed by the power generation reaction. A portion of the hydrogen gas is discharged via the anode outlet manifold 1e. The anode discharge gas thus discharged is supplied to the inlet of the injector 45 via the water separator 46 and the shutoff valve 47 which are provided on the downstream side of the anode and is thus re-supplied to the fuel cell 1.

A branched portion 49 is provided between the water separator 46 and shutoff valve 47, and the combustion device 30 is connected via a flow rate control valve (FCV) 48. The anode discharge gas thus discharged via the anode circulation path is discharged to the outside after undergoing combustion-processing in a CAT 30b.

The cooling system, which performs temperature regulation for the fuel cell 1, will be descried next.

A coolant reserve tank 51 constituting coolant storage means, a coolant pump 52 for circulating the coolant, and a radiator 50 for releasing the heat of the coolant are provided. The radiator 50 is provided with a radiator fan 50a, and the cooling capacity of the radiator 50 is controlled by regulating the flow rate of the passing air stream. The intake side of the coolant pump 52 is connected to the coolant reserve pump 51 and the outlet side is connected to a branched portion 58a. The branched portion 58a affords division into a warming-up loop that circulates in the combustion device 30 and a cooing loop that circulates in the radiator 50.

The warming-up loop is connected to the HE 30c of the combustion device 30, and the HE 30c exchanges heat between the coolant and the combustion gas that is generated by the CAT 30b. The coolant that is discharged from the HE 30c flows into the three-way valve 53. Meanwhile, the cooling loop is connected to the radiator 50 to subject the coolant to thermal radiation. The cooled coolant then flows into the three-way valve 53. The coolant temperature can be regulated in accordance with the operating state by causing coolant to flow into the warming-up loop when there is a desire to raise the coolant temperature and into the cooling loop when there is a desire to suppress the coolant temperature.

The remaining port of the three-way valve 53 into which the temperature-regulated coolant flows is connected to the coolant inlet manifold 1c with which the fuel cell 1 is provided. A conductance meter 121, a shutoff valve 54, a temperature sensor 116, and a pressure sensor 103 are provided between the three-way valve 53 and the fuel cell 1. A branched portion 57 that affords division into the above-described air temperature regulator 15 and the hydrogen temperature regulator 42 is formed between the conductance meter 121 and the shutoff valve 54. The air temperature regulator 15 exchanges heat between the coolant and the air that is supplied to the fuel cell 1. In addition, the hydrogen temperature regulator 42 exchanges heat between the coolant and the hydrogen gas that is supplied to the fuel cell 1, and then the coolant flows into an interflow portion 59 on the downstream side of the shutoff valve 54 via an ion filter 56 that is provided in order to remove ions in the coolant.

The temperature of the fuel cell 1 is regulated by the coolant that is introduced via the coolant inlet manifold 1c. Thereafter, the coolant that is discharged via a coolant outlet manifold 1f with which the fuel cell 1 is provided is re-circulated in the cooling system by means of the coolant pump 52, or is returned to the coolant reserve tank 51. A temperature sensor 117 for detecting the coolant temperature $T_{SO}$ that is discharged by the fuel cell 1, and a pressure control valve PCV 55 for regulating the pressure of the coolant, are provided.

The purified water system used in the humidification of the fuel cell 1 will be described next. The purified water system comprises a heat source such as an electric heater (not illustrated) and is capable of heating. When freezing during stoppage of the fuel cell 1 is predicted, freezing is prevented by discharging water from the purified water system.

The water tank 60 contains a water pump 61, a water level sensor 151 for detecting the amount of water in the water tank 60, which is the water level Lw here, and a temperature sensor 118. In addition, a strainer 62 for filtering out grains or similar in the water is provided at the inlet of the water pump 61. A discharge path 72, which has a conductance meter 122, an ion filter 63, and the above-described water injector 65, is provided on the discharge side of the water pump 61. The upstream side of the water injector 65 is connected to the PRV 64, and the amount of water sprayed via the water injector 65 is controlled by the regulation of the pressure of the discharge path 72 that is carried out by the PRV 64. Further, a return path 71 that communicates with the PRV 64 and the water tank 60 is provided and recovers the water removed from the discharge path 72 via the PRV 64 in order to regulate the pressure of the discharge path 72. In addition, the discharge path 72 is provided with a shutoff valve 66 and the return path 71 is provided with the shutoff valve 67. When the shutoff valves 66 and 67 are open, water is discharged via this circuit.

Furthermore, a path, which links the water separator 17, with which the air outlet manifold 1d is provided, and the water tank 60, is provided and is equipped with a shutoff valve 68. A path that links the water separator 17 with the outside is provided separately and is equipped with a shutoff valve 69. As a result, the water which is recovered by the water separator 17 is stored in the water tank 60 or discharged to the outside. In addition, a path, which links the water separator 46 provided on the side of the hydrogen outlet manifold 1e with the outside, is provided, and is equipped with a shutoff valve 70. When a large amount of water is recovered by the water separator 46, a circuit that returns the water of the water separator 46 to the water tank 60 may be provided in accordance with requirements.

In addition, a shutoff valve 74 that selectively discharges water in the water tank 60 to the outside is provided. When freezing during system stoppage is predicted by a freezing prediction section 100a (described subsequently), water in the water tank 60 is discharged by opening the shutoff valve 74. Further, the shutoff valves 67, 68 are opened to discharge the water in the discharge path 72 and return path 71. In addition, the water that is recovered by the water separators 17 and 46 is discharged by opening the shutoff valves 69, 70. Accordingly, water in the purified water system can be discharged when freezing is predicated, allowing freezing in the system to be reduced.

The above-described fuel cell system is controlled by a controller 100. The controller 100 controls the temperature of the fuel cell 1 by controlling each device and valve and so forth on the basis of the output of each sensor, or the like. The controller 100 may be constituted by a control unit in which a plurality of controllers is combined, and may be part of a control unit for controlling a vehicle. In addition, the freezing prediction section 100a for predicting freezing of water in the system is provided as part of the controller 100. Freezing prediction can, for example, be implemented by pre-storing temperature variation data relating to the region and season and comparing this data with the outside temperature $T_{ATM}$, or by obtaining information on the predicted air temperature wirelessly, or via a radio or car navigation system. The outside air temperature $T_{ATM}$ is detected by means of a temperature sensor 119.

Figure 2:
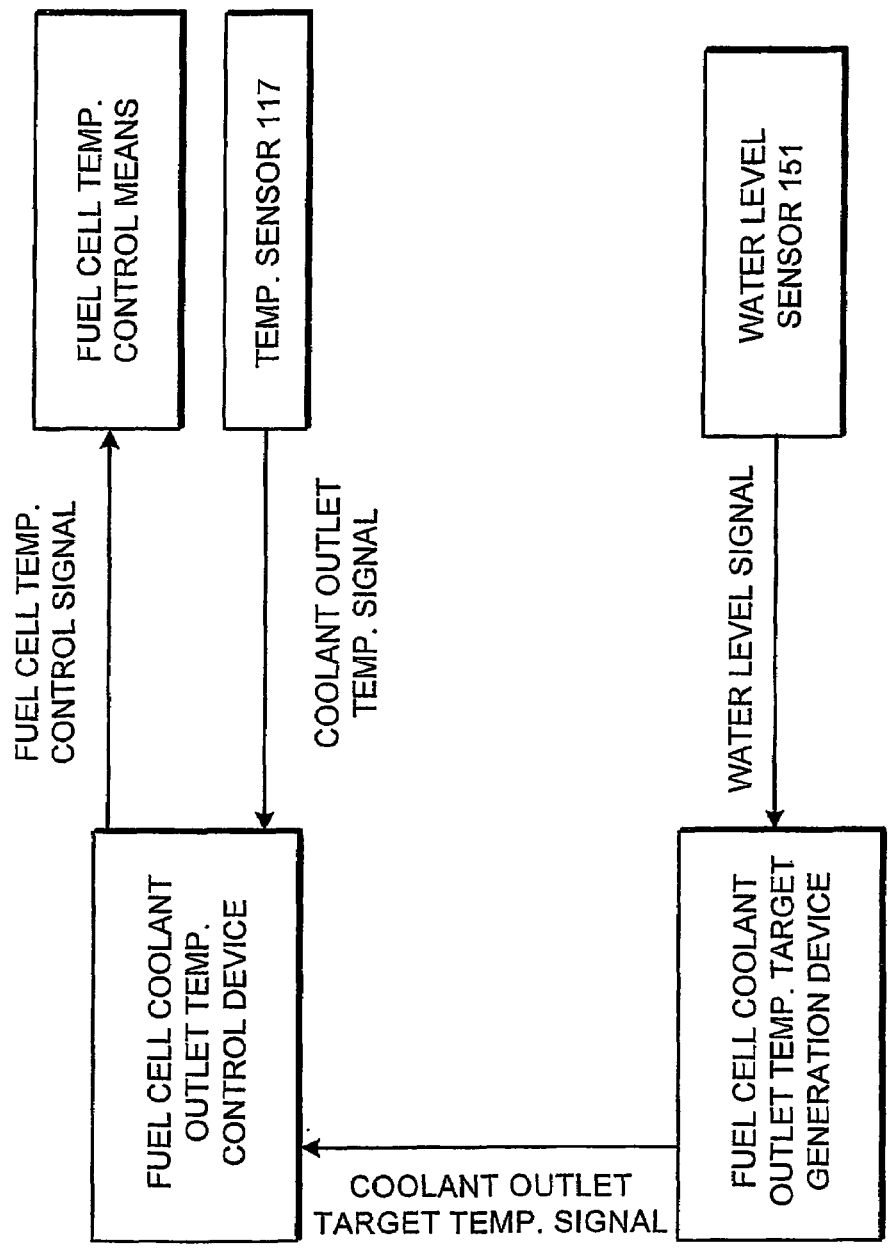
FIG. 2 is a block diagram of the temperature control of the fuel cell.

FIG. 2 shows schematic blocks for the temperature control of the fuel cell 1 performed by the controller 100.

A signal that indicates the water level Lw (water level signal) that is detected by the water level sensor 151 provided in the water tank 60 is input to a fuel cell coolant outlet temperature target generation device. The coolant outlet temperature generation device seeks the coolant outlet target temperature $T_{SOUPR}$ and outputs this temperature $T_{SOUPR}$ to a fuel cell coolant outlet temperature control device as a coolant outlet target temperature signal. Further, the coolant outlet temperature is detected by the temperature sensor 117 and is inputted to the fuel cell coolant outlet temperature control device as a coolant outlet temperature $T_{SO}$ signal. The fuel cell coolant outlet temperature control device outputs a fuel cell temperature control signal for controlling a three-way valve 53 for adjusting the coolant temperature based on the coolant outlet target temperature $T_{SOUPR}$ and the coolant outlet temperature $T_{SO}$ (detected values), and thus controls the fuel cell temperature control means.

Figure 3:
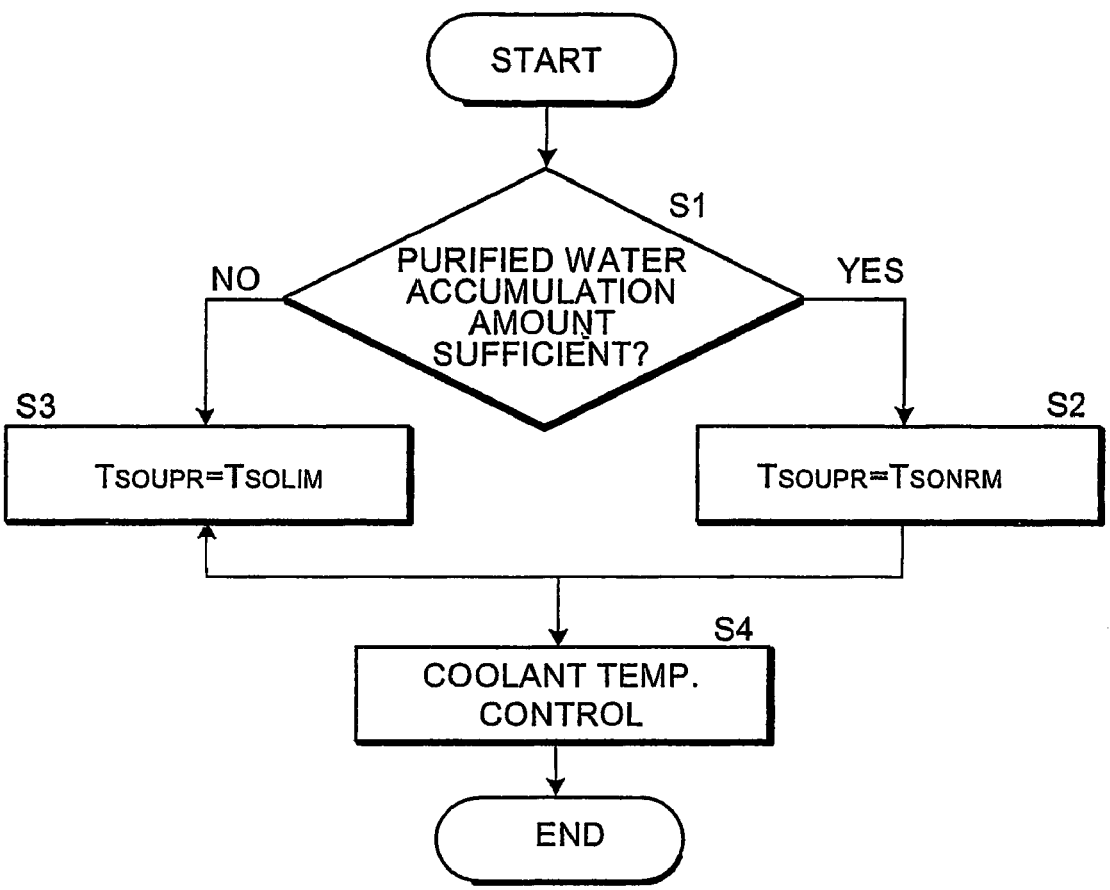
FIG. 3 is a flowchart showing an outline of the temperature control of the fuel cell.

Next, an outline of the temperature control of the fuel cell 1 during startup is shown in FIG. 3.

When a command to commence startup is detected and the temperature of the fuel cell 1 has been raised to a temperature allowing the electrical power required for a vehicle start to be generated, the control shown in FIG. 3 begins. In the judgment of the purified water accumulation amount in step S1 of FIG. 3, the water level Lw is detected by means of the water level sensor 151. When the water level Lw is equal to or more than a predetermined level Lw1, it is judged that there is sufficient water in the water tank 60 and that this water can be used for humidification, whereupon processing moves on to step S2. In step S2, $T_{SOUPR}$, which is the target upper limit temperature of the coolant at the outlet of the fuel cell 1, is set to the normal temperature $T_{SONORM}$.

On the other hand, when it is judged in step S1 that Lw does not satisfy Lw1, because the purified water accumulation amount is insufficient, processing moves on to step S3, whereupon the coolant outlet target temperature $T_{SOUPR}$ of the fuel cell 1 is set to a limit temperature $T_{SOLIM}$ that is lower than normal. As a result, the water for the humidification using purified water can be prepared and humidification started before dryout occurs due to a humidification shortage of the fuel cell 1. Once the coolant outlet target temperature $T_{SOUPR}$ has been set, the temperature of the coolant is regulated in step S4 (coolant temperature control), whereby the temperature of the fuel cell 1 is regulated.

Figure 4:
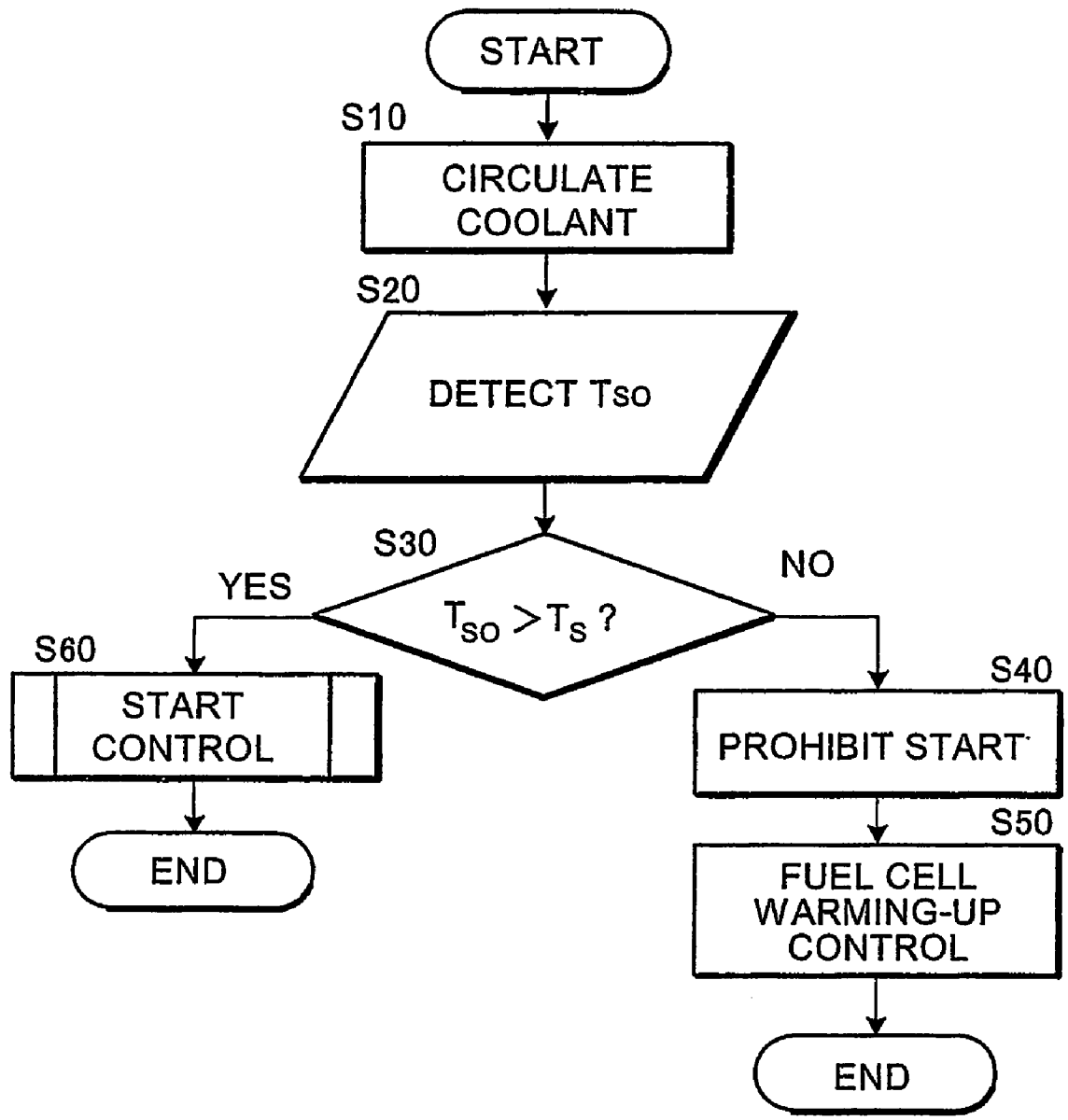
FIG. 4 is the main routine of the cooling system of the fuel cell system.

The details of this control will be provided next with reference to FIG. 4.

Once the startup command of the fuel cell system has been detected, the coolant pump 52 is driven to circulate the coolant in step S10. Antifreeze is used as the coolant in order to prevent freezing during system stoppage. The coolant pump 52 is driven under the electrical power from a secondary battery (not illustrated). The conductance of the coolant is monitored by the conductance meter 121. The three-way valve 53 is set such that the warming-up loop and the fuel cell 1 are connected.

When the conductance of the coolant is equal to or more than a predetermined conductance that renders operation impossible, the shutoff valve 54 is closed. As a result, all of the coolant passes through the ion filter 56 and the conductance can be efficiently lowered. Once the conductance of the coolant is smaller than a predetermined value, the shutoff valve 54 is opened and the processing moves onto step S20.

In step S20, the coolant outlet temperature $T_{SO}$ of the fuel cell 1 is detected by the temperature sensor 117. In step S30, it is judged whether or not the coolant outlet temperature $T_{SO}$ has reached the predetermined temperature $T_S$. The predetermined temperature $T_S$ is a temperature such that when the temperature is at least larger than the temperature $T_S$, the electrical power required for vehicle travel can be generated by the fuel cell 1. Although there will be a variation depending on the capacity of the fuel cell 1, the output required for travel generally can be secured if the temperature is higher than approximately 0° C. at which the water generated by the power generation will not re-freeze. Here, $T_S$ is set at 0° C.

Once it is judged in step S20 that $T_{SO}$ is equal to or less than $T_S$ ($T_{SO} \leq T_S$), because the electrical power required for a vehicle start has not been obtained, processing moves on to step S40, whereupon a signal prohibiting the start is output. In step S50, $T_{SO}$ is raised by increasing the temperature of the fuel cell 1 by means of fuel cell warming-up control. The fuel cell warming-up control of step S50 is described hereinbelow.

Warming-up control is performed by the combined application of the heating of the fuel cell 1 that is carried out by using the heat accompanying the combustion in the combustion device 30, and the heat generation itself that is generated by the power generation of the fuel cell 1 itself. When it is judged that $T_{SO} \leq T_S$ at operation startup below freezing and so forth, the temperature of the CAT 30b is raised by allowing electrification of the EHC 30a. The temperature of the CAT 30b is monitored by the temperature sensor 113, and once the temperature has been raised to the temperature region in which hydrogen ignites, the compressor 20 is driven. The air discharged by the compressor 20 passes through the air temperature regulator 15, the WRD 21 and the fuel cell 1, and is then supplied to the combustion device 30 via the PCV 18. Hydrogen gas stored in the hydrogen tank 40 is supplied to the fuel cell 1 by opening the shut off valve 41 at the same time. Here, because the shutoff valve 47 is closed, the hydrogen is supplied to the combustion device 30 via the branched portion 49 without being re-circulated via the injector 45. The hydrogen flow rate introduced to the combustion device 30 is regulated by the FCV 48. The hydrogen flow rate is detected by the flow meter 44 and feedback control is performed by using the detected value. Here, the FCV 48 is controlled such that the hydrogen flow rate is the sum of the hydrogen flow rate required in order to perform predetermined heat generation in the catalytic combustion of the CAT 30b, and the hydrogen flaw rate required for the power generation of the fuel cell 1 itself.

The power generation amount of the fuel cell 1 is the amount of electrical power that can be consumed by auxiliary machines. When electric heating means such as an electric heater for heating the cooling system are used, the permissible power generation amount is increased further, and, once the power generation amount of the fuel cell 1 itself has increased, electricity can also be used in the heating of the fuel cell 1. This is therefore advantageous for a shortening of the startup time interval and for a reduction of the amount of hydrogen consumed for the startup and so forth.

In order to control the combustion temperature of the CAT 30b, the discharge flow rate of the compressor 20 is controlled to a predetermined air flow rate with respect to the hydrogen flow rate passed, that is, to achieve a predetermined air-fuel ratio. The combustion gas temperature is monitored by using the temperature sensor 114 with which the HE 30c is provided, and the air flow rate undergoes feedback control so that the combustion gas temperature is at a target temperature.

Since the coolant pump 52 is operated at this time, the coolant passes through the heat exchange portion of the HE 30c. The coolant temperature rises in the HE 30c as a result of the heat exchange between the combustion gas supplied by the CAT 30b and the coolant. Having undergone a temperature increase, the coolant passes through the three-way valve 53 and the opened shutoff valve 54, and is introduced to the coolant inlet manifold 1c of the fuel cell 1. Part of the coolant branches off in the branched portion 57, and returns to the interflow portion 59 via the air temperature regulator 15 and hydrogen temperature regulator 42 before flowing to the fuel cell 1. The heat generated by the CAT 30b is thus conveyed to the fuel cell 1 via the coolant. Accordingly, the fuel cell 1 is able to rapidly undergo a temperature increase under its own heat generation and as a result of the heat generated by the combustion device 30.

The fuel cell 1 efficiently exchanges heat with the coolant, and therefor the coolant temperature in the coolant outlet manifold 1f of the fuel cell 1 drops to substantially the temperature of the fuel cell 1. Therefore, the fuel cell 1 is rapidly heated and rises in temperature, while the coolant is close to the temperature of the fuel cell 1. Accordingly, if the temperature of the fuel cell 1 is not higher than $T_S$, the coolant outlet temperature $T_{SO}$ of the fuel cell 1 is barely higher than $T_S$. It is therefore judged from the coolant outlet temperature $T_{SO}$ whether or not the temperature of the fuel cell 1 is higher than $T_S$. Steps S10 to S50 are repeated until the fuel cell outlet temperature $T_{SO}$ is higher than the temperature $T_S$ at which the electrical power required for a vehicle start can be generated.

Figure 5:
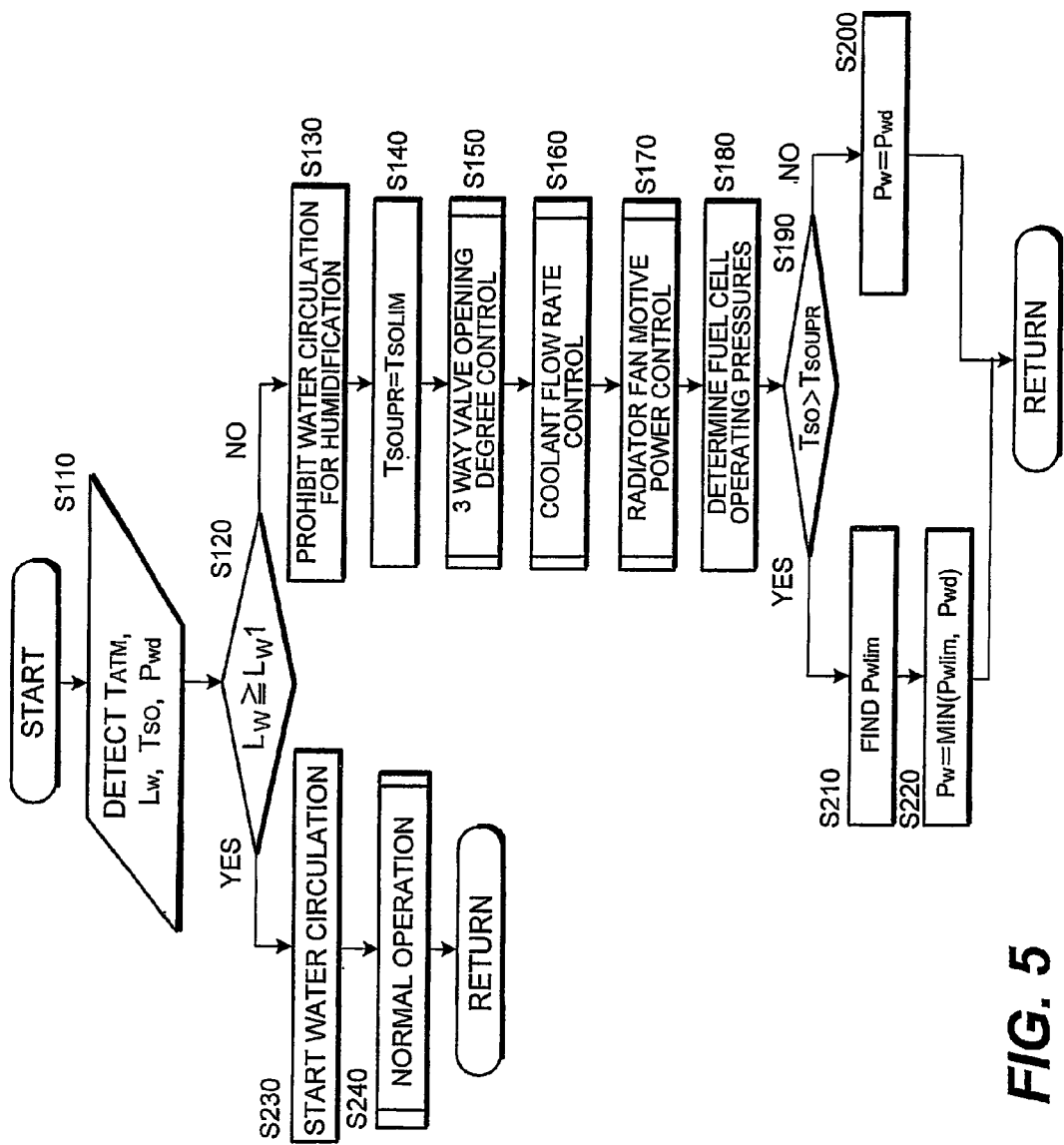
FIG. 5 is a flowchart of cooling system control during a vehicle start.

On the other hand, once it has been judged in step S30 that $T_{SO} > T_S$, processing moves on to step S60, whereupon the start control when the vehicle is started is performed. Here, the operator is informed when the vehicle has entered a state permitting travel by causing a lamp to light up and so forth. The start control of step S60 will now be described with reference to FIG. 5.

In step S110, the outside temperature $T_{ATM}$, the water tank level Lw, the fuel cell coolant outlet temperature $T_{SO}$, and a requested output Pwd from the vehicle control controller (not shown) are detected. Next, processing moves on to step S120 in which it is detected whether the water tank level Lw is equal to or more than Lw1. Lw1 is the water tank level which permits the start of water circulation. When the water tank level is too low, there is the possibility that a problem will occur such as water not being taken up by the water pump 61.

Water that is generated through recovery by the water separator 17 that is provided in the cathode outlet manifold 1d during power generation is stored in the water tank 60. The water tank 60, return path 71, and water piping from the fuel cell 1, as well as the valve 68 in this piping, prevent the re-freezing of water through heating by an electric heater (not shown). At fixed intervals during the operation of the fuel cell 1 or as judged from the level of the water accumulated in the water separator 17, or similar, the valve 68 is opened and generated water has been retuned to the water separator 17 is stored in the water tank 60.

In this embodiment, when it is judged that there is the possibility of water in the water tank 60 freezing during system stoppage, water is discharged from the purified water system to the outside. Accordingly, when water is discharged from the purified water system, there is a need to secure water at the time of the next startup. Therefore, it is judged whether there is a need to secure water by examining the water level Lw of the water tank 60 in step S120.

When the water tank level Lw is smaller than Lw1 in step S120 and water circulation is impossible, processing moves on to step S130. In step S130 and subsequent steps, temperature control of the fuel cell 1 to increase the water level Lw of the water tank 60 is executed.

In step S130, a command to prohibit the circulation of the water accumulated in the water tank 60 is output. In step S140, the coolant outlet target temperature $T_{SOUPR}$ is set to $T_{SOLIM}$. $T_{SOLIM}$ is an operating temperature that makes it possible to prevent dryout caused by a humidification shortage of the fuel cell 1 with respect to a required time interval up until water accumulates in the water tank 60.

Figure 6:
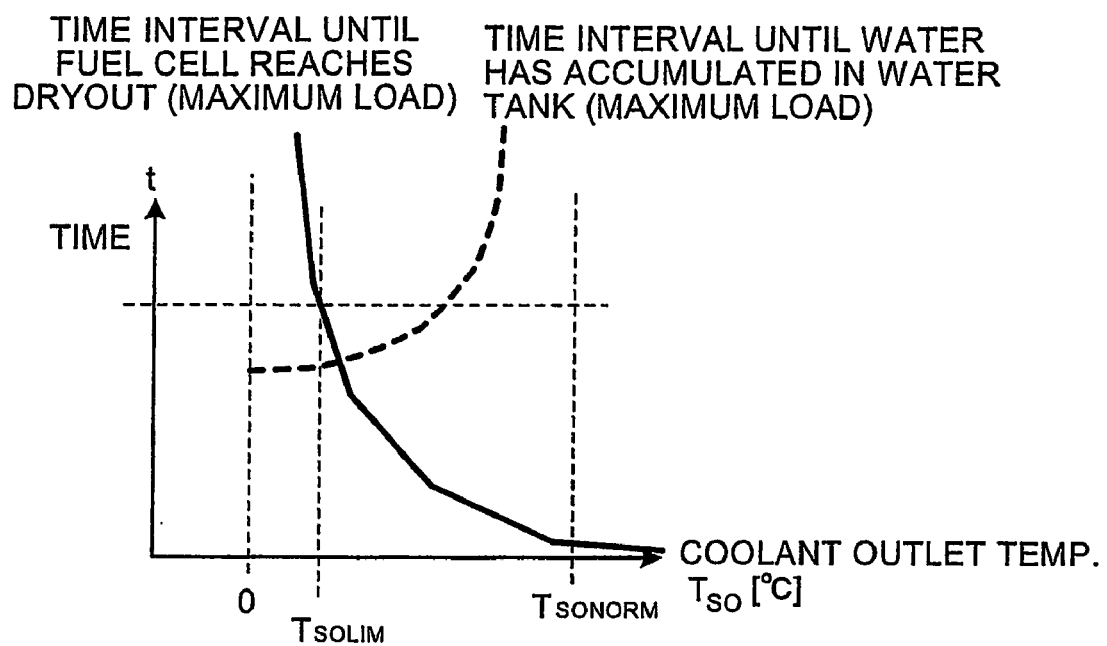
FIG. 6 is a table specifying the relationship between the time interval up until dryout with respect to the coolant outlet temperature and the time interval required in order to secure the water with respect to the coolant outlet temperature.

FIG. 6 shows the time interval until the fuel cell 1 reaches dryout due to a humidification shortage with respect to the coolant outlet tempera $T_{SO}$ of the fuel cell 1, and the time interval until water has accumulated in the water tank 60 when a maximum load operation is executed with respect to the coolant outlet temperature $T_{SO}$ of the fuel cell 1. $T_{SOLIM}$ is set such that the time interval required for the accumulation of water is shorter than the time interval up until the fuel cell 1 dries out due to a water shortage. The temperature of the cathode discharge gas is suppressed by suppressing the operating temperature of the fuel cell 1 and, because the amount of water recovered by the water separator 17 increases, the time interval required for storage can be shortened. At the same time, because the evaporation of moisture contained in the proton-exchange membrane of the fuel cell 1 is prevented, the time interval up until dryout of the fuel cell 1 caused by a humidification shortage is produced can be extended.

However, when the external air temperature $T_{ATM}$ is high, it is difficult to keep the operating temperature of the fuel cell 1 at a low temperature with a high output that permits vehicle travel. For this reason, when the limit temperature $T_{SOLIM}$ is set at a temperature that is very low, there is a need to restrict the output with the external air temperature at or above a certain predetermined value. Therefore, $T_{SOLIM}$ is set at a temperature equal to or more than a lower limit that allows the temperature of the fuel cell 1 to be limited while obtaining the output required for travel. Further, in a system that performs drainage only at low temperatures at which the freezing of water is to be expected, a low external temperature is expected when restarting takes place after discharging the water in the water tank 60. In this case, the operating temperature of the fuel cell 1 can be set low.

Once $T_{SOUPR}=T_{SOLIM}$ is set in step S140, processing moves on to step S150 to control the degree of opening of the three-way valve 53.

Figure 7:
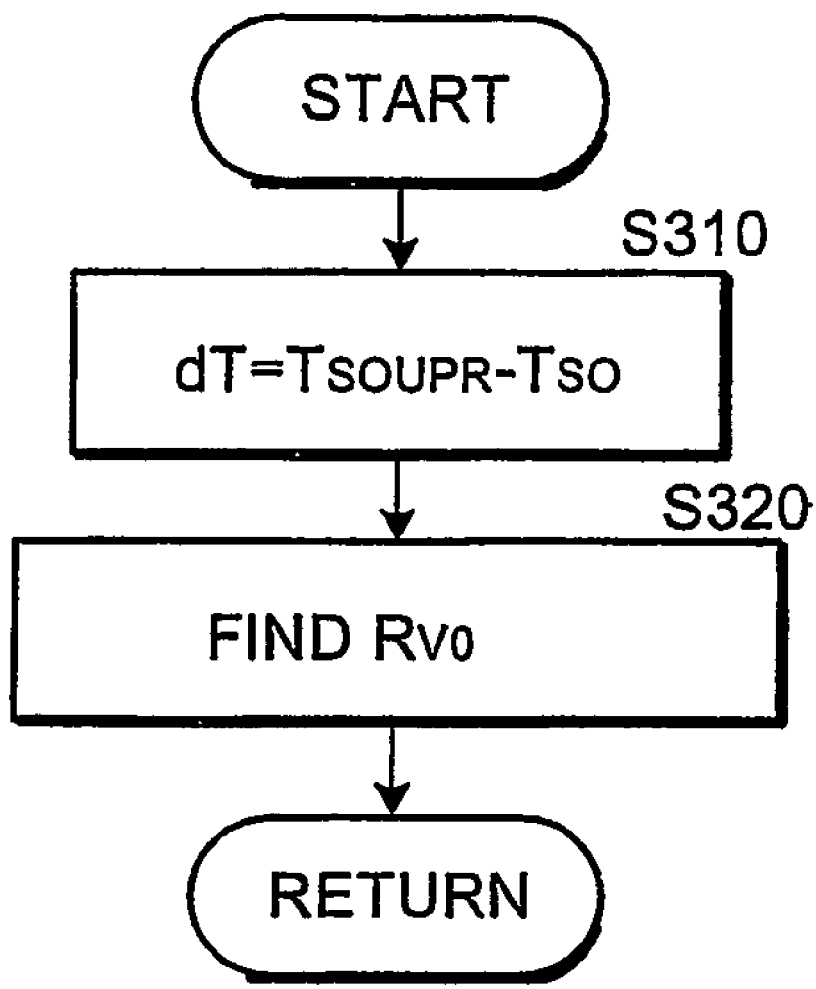
FIG. 7 is a flowchart for setting the degree of opening of a three-way valve.

Control of the degree of opening of the three-way valve 53 will now be described with reference to FIG. 7. The flow rate distribution is regulated by the degree of opening of the three-way valve 53 so that the coolant flows toward the warming-up loop or the cooling loop.

Figure 8:
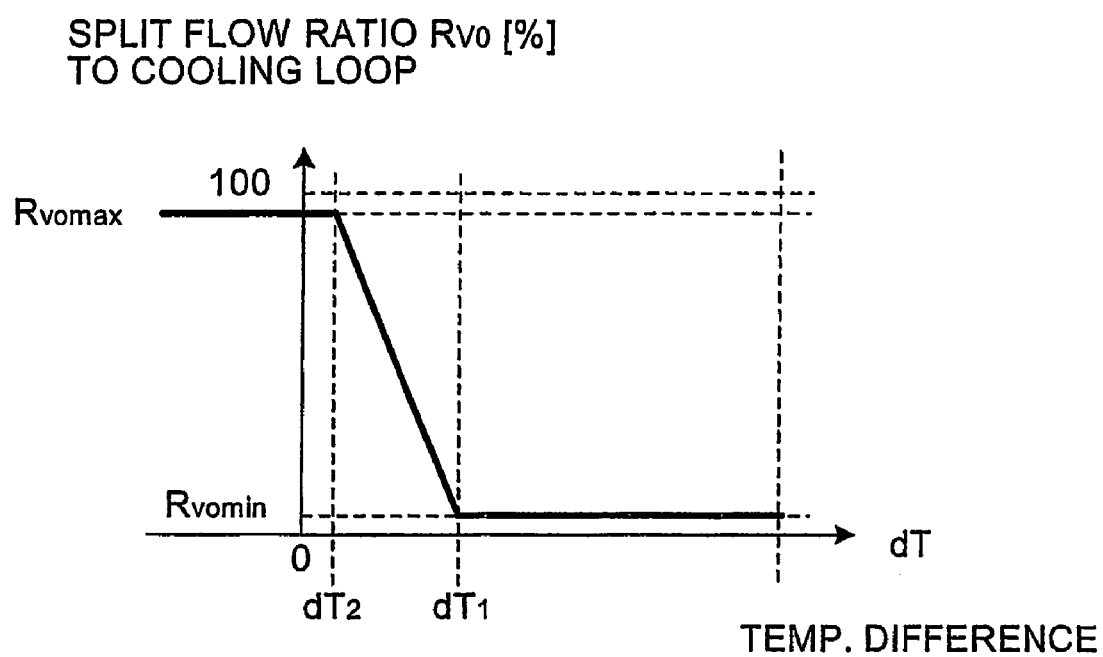
FIG. 8 is a table specifying the relationship of the degree of opening of the three-way valve with respect to a temperature deviation.

In step S310, the difference $dT=T_{SOUPR}-T_{SO}$ between the coolant outlet temperature $T_{SO}$ of the fuel cell 1 and the coolant outlet target temperature $T_{SOUPR}$ is found. In step S320, the degree of opening $R_{VO}$ of the three-way valve 53 is sought by means of a map such as that shown in FIG. 8 in accordance with this difference dT. FIG. 8 shows the spit flow ratio $R_{VO}$ to the cooling loop which is set with respect to the temperature difference dT. When $R_{VO}=100\%$, this means that all of the cumulated coolant flows to the cooling loop. When the difference dT is large, an increase in the coolant temperature is promoted by causing substantially all the coolant to flow to the warming-up loop by rendering $R_{VO}$ a minimum value $R_{VOMIN}$. However, when a temperate difference dT is equal to or less than a predetermined value $dT_1$, the split flow ratio $R_{VO}$ is increased so that coolant is also circulated to the cooling loop. When the temperature difference is $dT_2$, the split flow ratio $R_{VO}$ to the cooling loop is at a maximum. As a result, when the cavity of the cooling system is adequate for external temperatures, the temperature difference dT can be controlled between $dT_1$ and $dT_2$ in this condition. However, when the temperature difference dT is equal to or less than $dT_2$ in this condition, this indicates that the capacity of the cooling system is inadequate and temperature control cannot be performed. Further, here, $dT_2$ is a positive value close to 0. That is, the distribution of the coolant to the cooling loop is maximized when $T_{SO}$ is a temperature that is less than $T_{SOUPR}$ and in the vicinity thereof.

Figure 9:
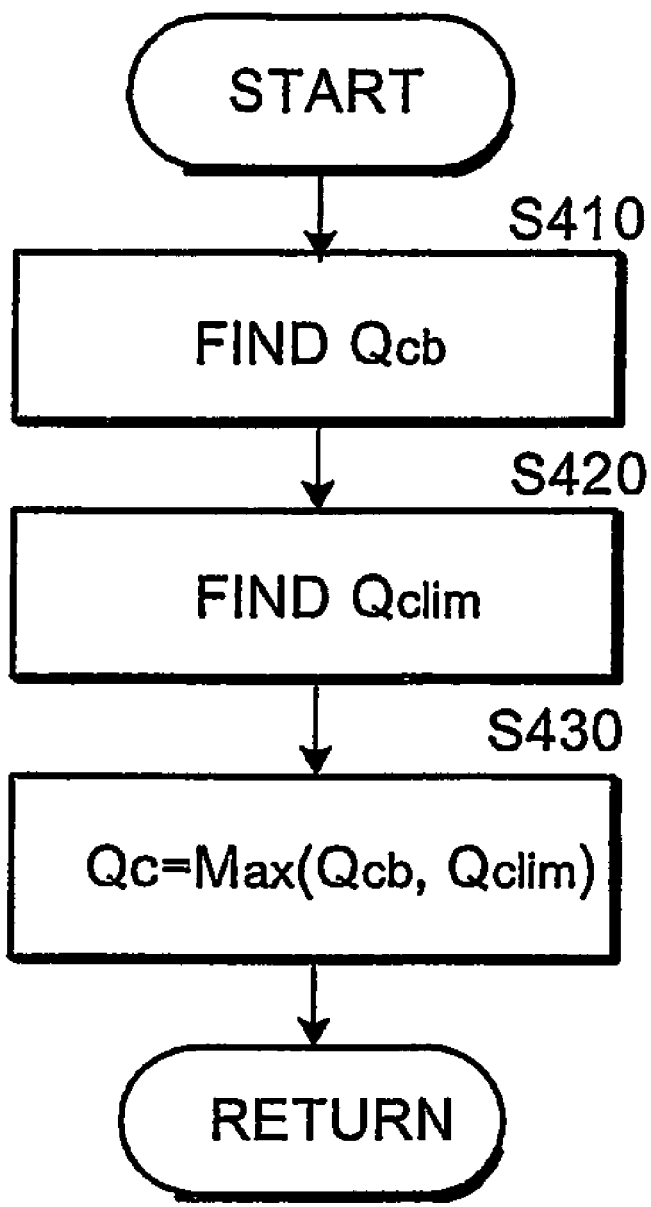
FIG. 9 is a flowchart for setting the coolant flow rate.

Once the three-way valve 53 has been thus controlled, processing moves on to step S160 to control the coolant flow rate. Control of the coolant flow rate is performed with reference to FIG. 9.

Figure 10:
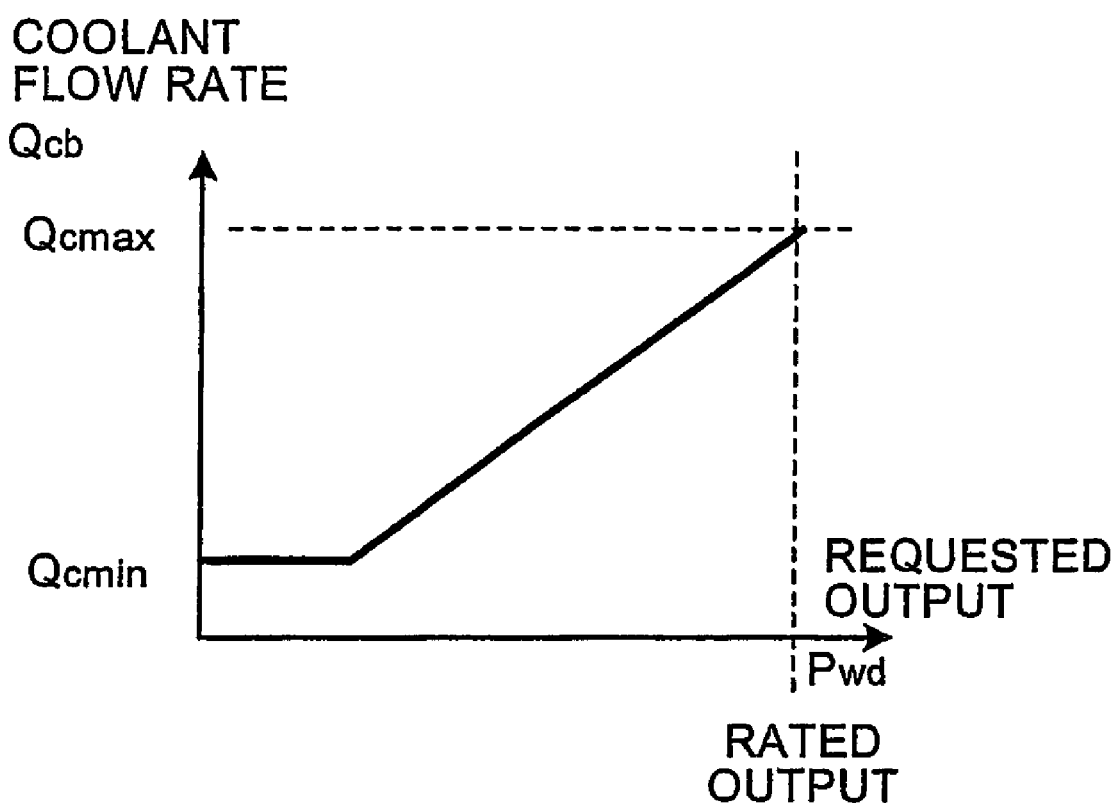
FIG. 10 is a table specifying the relationship of the coolant flow rate with respect to the fuel cell output.
Figure 11:
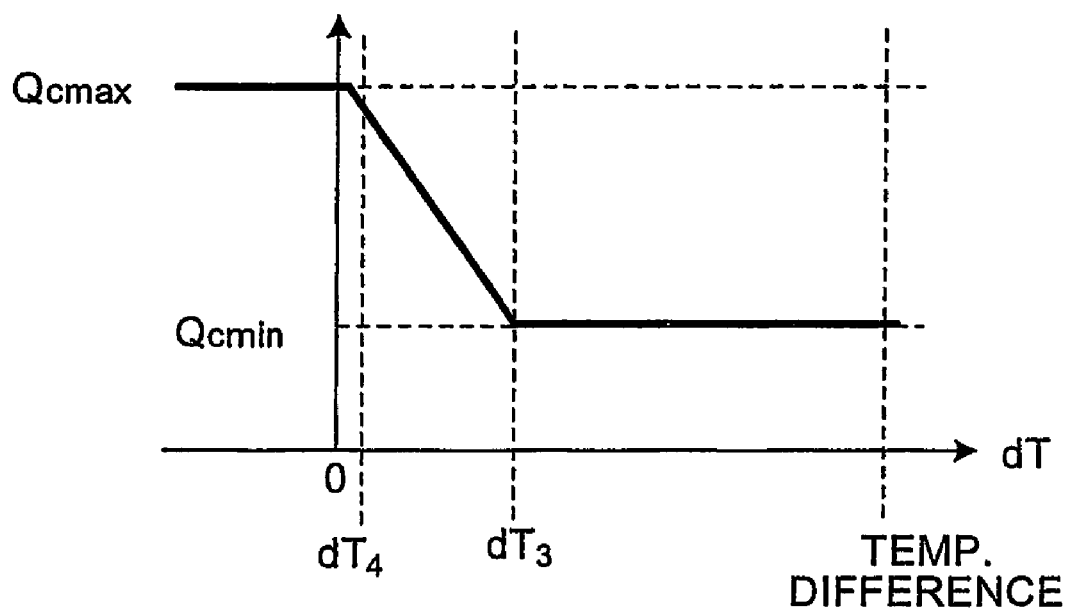
FIG. 11 is a table specifying the relationship of the minimum limit value of the coolant flow rate with respect to a temperature deviation.

First of all, in step S410, a base flow rate Qcb for the coolant flow rate with respect to the requested output Pwd is retrieved by means of a map such as that shown in FIG. 10. The base flow rate Qcb is the normal coolant flow rate required for the requested output Pwd, and is set between the lowest flow rate Qcmin and the maximum value Qcmax of the coolant pump 52. Next, in step S420, the minimum limit value Qclim for the coolant flow rate with respect to the temperature difference dT found in step S310 of FIG. 7 is found. A map of the minimum limit value Qclim with respect to the temperature difference dT, such as that shown in FIG. 11, is pre-stored and searched to find the minimum limit value Qclim of the coolant flow rate. At the moment dT is $dT_4$, which is a positive value close to 0, the minimum limit value Qclim is the maximum value Qcmax. That is, the maximum coolant flow rate occurs at the moment the detected temperature $T_{SO}$ has reached a value close to the target temperature $T_{SOUPR}$.

Next, in step S430, the values of the base flow rate Qcb and the minimum limit value Qclim are compared and the larger of these values is selected to become the coolant flow rate Qc. The rotational speed of the coolant pump 52 is controlled to the rotational speed for implementing the coolant flow rate Qc.

As shown in FIGS. 8 and 11, $dT_4$, for which Qclim=Qcmax, is set at a value that is smaller than $dT_2$, for which $R_{VO}=R_{VOMAX}$, so that all the coolant flows toward the cooling loop. That is, the split flow ratio $R_{VO}$ for a split toward the cooling loop reaches a maximum value first. However, when the cooling capacity for control to establish the target temperature is inadequate, the temperature of the fuel cell 1 is also suppressed by maximizing the total coolant flow rate Qc. More particularly, when the detected temperature $T_{SO}$ exceeds the target temperature $T_{SOUPR}$ in the cooling system (dT<0), the maximum coolant flow rate is then the maximum flow rate to the cooling loop.

Figure 12:
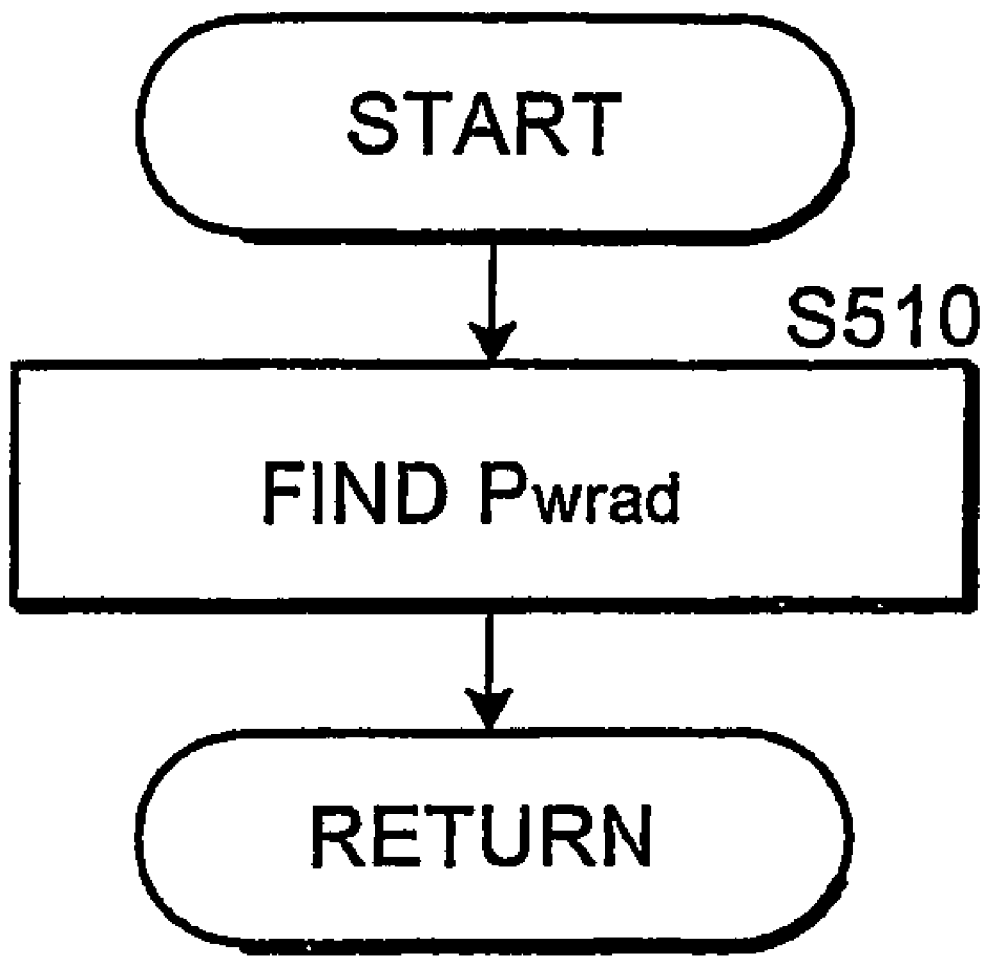
FIG. 12 is a flowchart for the operational control of the radiator fan.

Next, the radiator fan 50a provided on the radiator 50 is controlled in step S170. Radiator fan motive power control is shown in FIG. 12.

Figure 13:
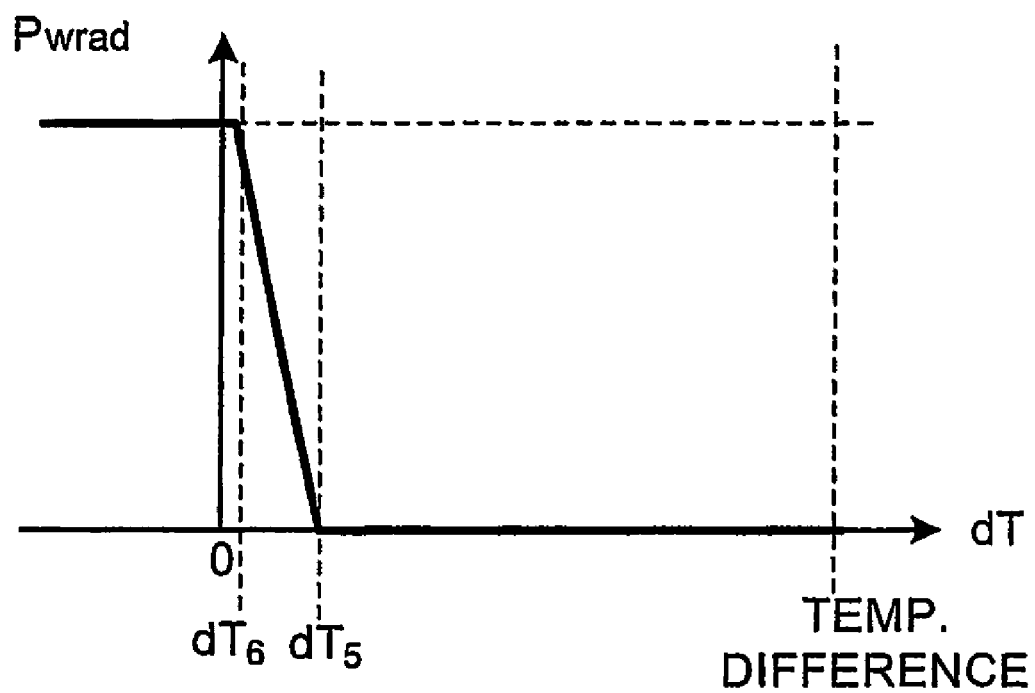
FIG. 13 is a table specifying the relationship of the radiator fan motive power with respect to a temperature deviation.

In step S510, the radiator fan motive power Pwrad with respect to the temperature difference dT is found. A map such as that shown in FIG. 13 is pre-stored and the radiator fan motive power Pwrad with respect to the temperature difference dT found in step S310 is retrieved. As shown in FIG. 13, the radiator fan motive power Pwrad reaches a maximum when dT is a positive value $dT_6$ (<$dT_4$) close to 0. That is, for the cooling loop including the radiator 50, once $T_{SO}$ approaches $T_{SOUPR}$, the maximum cooling capacity is exhibited. For this reason, the cooling system exhibits the maximum capacity in a situation where the target temperature is exceeded. Here, in accordance with $dT_6$<$dT_4$, the radiator fan motive power Pwrad reaches a maximum after the load of the coolant pump 52 has reached a maximum.

Figure 14:
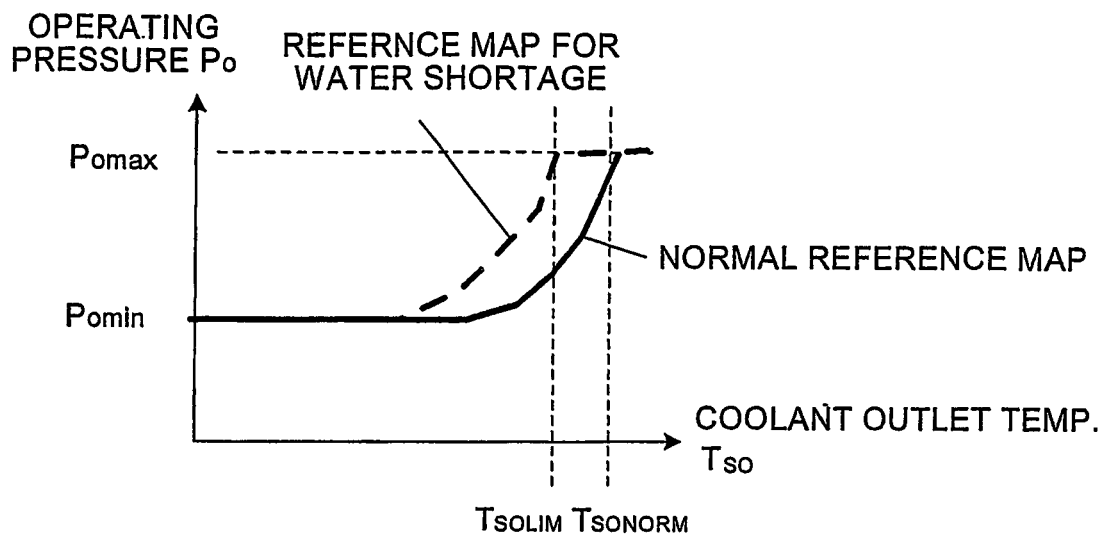
FIG. 14 is a table specifying the relationship of the operating pressure with respect to the fuel cell temperature.

Next, the processing moves on to step S180 to determine the operating pressures of the fuel cell 1. The operating pressures are, specifically, the respective pressures of the hydrogen gas and the oxidizing agent supplied to the fuel cell 1. These pressures are each controlled by the PCV 43 and PCV 18 on the basis of a reference map for when there is a water shortage with respect to the coolant outlet temperature $T_{SO}$, which is shown in FIG. 14. Further, because the hydrogen gas pressure and the oxidizing agent pressure are controlled to substantially the same pressure on account of the need to keep the pressure on both sides of the proton-exchange member substantially the same, one map in FIG. 14 may be referenced in order to set these pressures. During normal operation, the operating pressure is such that a pressure whereby a water balance is achieved with respect to the $T_{SO}$ that represents the fuel cell operating temperature is set. However, when it is judged in step S120 that liquid-phase water is inadequate, a reference map for when there is a water shortage at a higher pressure than that of the map during normal control is searched. The pressure obtained by searching the map is a pressure at which the water balance is positive, and further prevents a humidification shortage of the fuel cell 1 and results in an increased humidification water accumulation speed. As a result, the time interval until the humidification water has accumulated can be shortened and the operating temperature limit time interval can also be shortened, and this is advantageous from the perspective of greater durability.

Once the operating pressure of the fuel cell 1 has been determined, it is judged in step S190 whether the coolant outlet temperature $T_{SO}$ has not exceeded the predetermined temperature $T_{SOUPR}$.

When the predetermined temperature $T_{SOUPR}$ is not exceeded, processing moves on to step S200, and the output Pw of the fuel cell 1 is set to the requested output Pwd. That is, the output as per the request is generated rather than the output being limited. Accordingly, when $T_{SO}$ is lower than the target limit temperature $T_{SOUPR}$, the output is not limited even when the external temperature $T_{ATM}$ is high, and hence the circumstances for limiting the output can be reduced.

Figure 15:
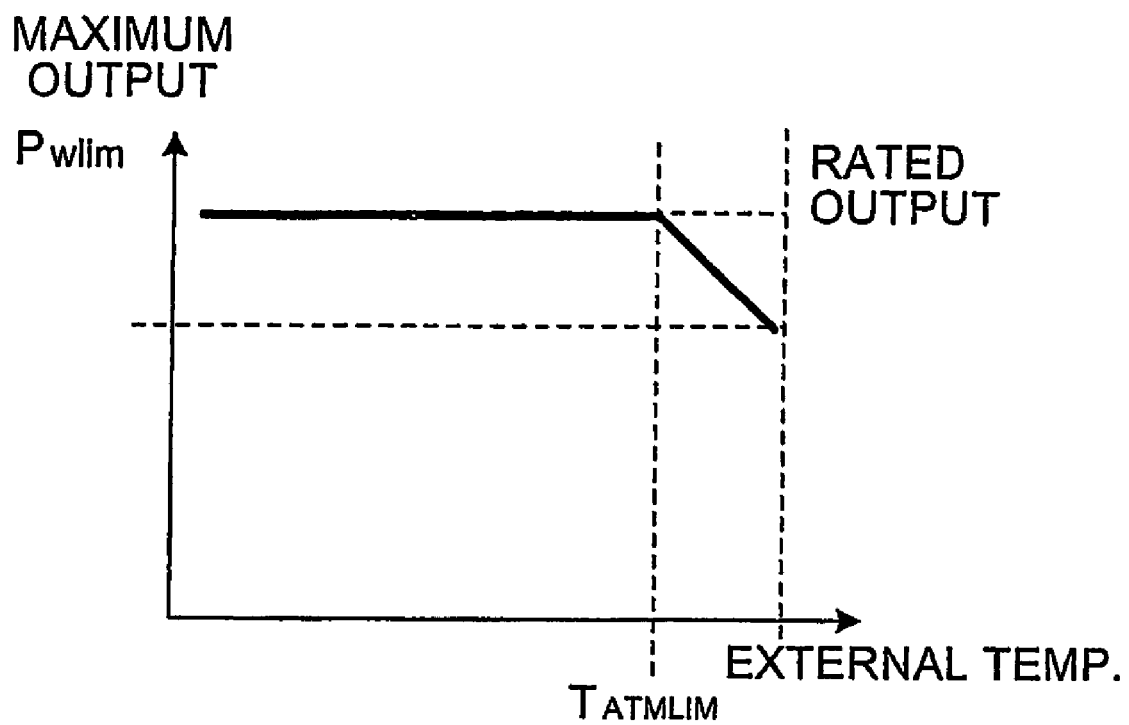
FIG. 15 is a table specifying the relationship of the fuel cell maximum output with respect to the outside temperature.

On the other hand, when the coolant outlet temperature $T_{SO}$ exceeds the predetermined temperature $T_{SOUPR}$ in step S190, the processing moves on to step S210. In step S210, a maximum output limit value Pwlim that is set with respect to the external temperature $T_{ATM}$ is retrieved by referencing the map show in FIG. 15. When the external temperature $T_{ATM}$ is high and the capacity of the cooling system is inadequate, the output is limited in order to maintain the target temperature $T_{SOUPR}$. When the output is equal to or less than the maximum output Pwlim, the coolant outlet temperature $T_{SO}$ is equal to or less than the target temperature $T_{SOUPR}$. In other words, when $T_{ATM}=T_{ATMLIM}$, the cooling capacity is at a maximum, the three-way valve 53 is opened to a maximum toward the cooling loop, the load on the water tank 60 is at a maximum, the motive power of the radiator fan 50a is at a maximum, and the coolant outlet temperature $T_{SO}$ is maintained at a target temperature $T_{SOUPR}$.

Next, in step S220, the requested output Pwd and the maximum output limit value Pwlim are compared. Then, the lower value is selected and set as the fuel cell output Pw. Accordingly, while the outlet temperature $T_{SO}$ exceeds the limit temperature $T_{SOUPR}(=T_{SOLIM})$ and dryout due to a humidification shortage of the fuel cell 1 is prevented, the circumstance in which it is necessary to limit the output from the fuel cell 1 is minimized.

Figure 16:
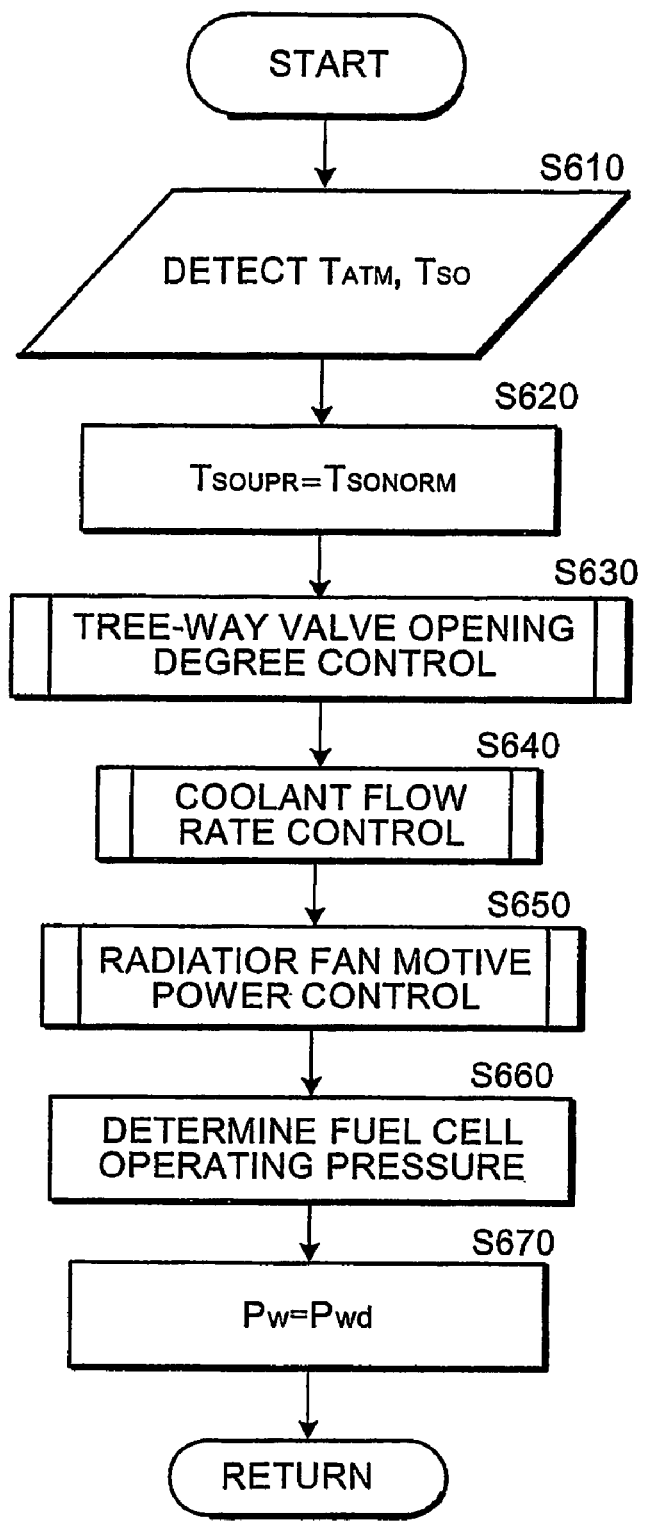
FIG. 16 is a flowchart at the time of a transition to normal operation.

When complete, processing returns to the beginning and this control is repeated. However, when it is detected in step S120 that the water tank level Lw>Lw1, it is judged that it has been possible to secure the liquid phase water required for water circulation, whereupon processing moves on to step S230 and the water pump 61 is driven to start the water circulation. Then, processing moves on to step S240 and a transition to normal operation is made. The transition to normal operation will now be described with reference to FIG. 16.

In step S610, the external temperature $T_{ATM}$, and the coolant outlet temperature $T_{SO}$ of the fuel cell 1, are detected. In step S620, the coolant outlet target temperature $T_{SOUPR}$ is set to $T_{SONORM}$. The temperature $T_{SONORM}$ is the operating temperature at which a heat balance and water balance can be achieved and at which normal efficiency is prioritized. In steps S630 to 650, similarly to S150 to 170 in FIG. 5, the degree of opening of the three-way value 53, the coolant flow rate, and the motive power of the radiator fan 50a are set. However, in steps S630 to S650, the value of $T_{SOUPR}$ is set to $T_{SONORM}$ rather than to $T_{SOLIM}$. Once the cooling capacity of the coolant has been thus set, processing moves on to step S660 and the operating pressure of the fuel cell 1 is set as per step S180. In FIG. 14, a normal reference map is used and a pressure whereby a water balance with respect to the $T_{SO}$ that represents the fuel cell operating temperature is achieved is set. Once the operating pressure of the fuel cell 1 has been determined, the output Pw of the fuel cell 1 is set to the requested output Pwd in step S670.

The opportunity to be able to maintain the output from the fuel cell 1 at the requested output while suppressing deterioration caused by a humidification shortage of the fuel cell 1 can be increased by suppressing the temperature of the fuel cell 1 by adjusting the cooling system.

Figure 17:
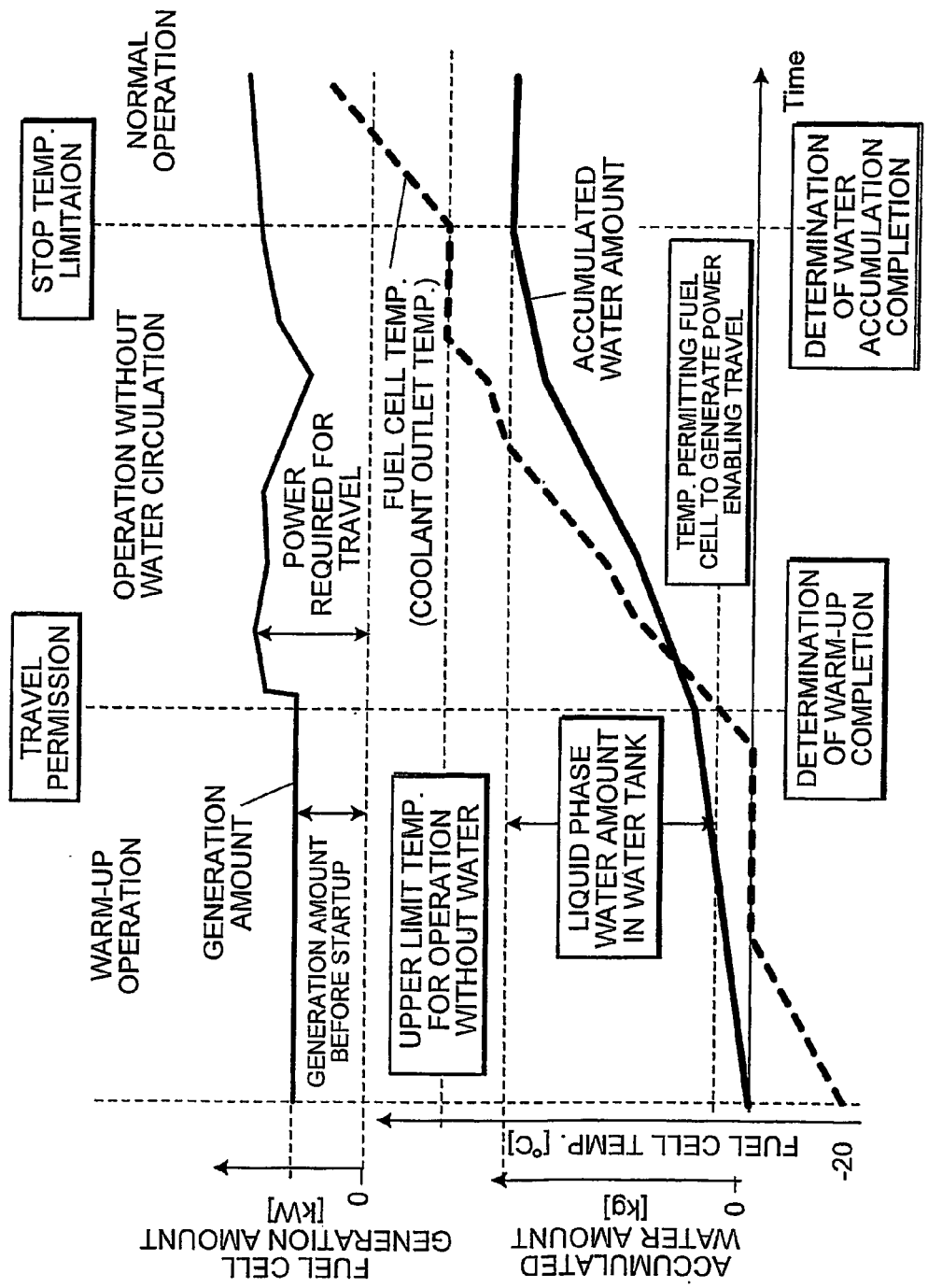
FIG. 17 is a timing chart that shows the variation in the fuel cell temperature and accumulated water amount.

Next, the variation in the time interval for the amount of water accumulated in the water tank 60, and the variation in the fuel cell temperature, when control such as that descried above is performed, are shown in FIG. 17. After startup has begun, the fuel cell 1 is warmed up by combustion and by its own heat generation until the electrical power required for travel can be generated by the fuel cell 1. At such time, water accompanying the reaction of the fuel cell 1 is generated and water is stored in the water tank 60. Once the temperature of the fuel cell 1 has risen to a level permitting same to generate the electrical power enabling travel, vehicle travel is begun. Although travel commences and the fuel cell temperature and stored water amount increase, the cooling system is adjusted so that the fuel cell temperature does not exceed the operating target temperature $T_{SOUPR}(=T_{SOLIM})$. At such time, if it is impossible to suppress the temperature in the cooling system alone, the operating temperature is suppressed by suppressing the output of the fuel cell 1. Once the amount of stored water has reached a predetermined value permitting humidification, normal operation is begun by setting the operating target temperature $T_{SOUPR}$ to $T_{SONORM}$.

Next, the effects produced by the fuel cell system of this embodiment will be described.

A fuel cell system, which is provided with a fuel cell 1 that is equipped with an electrolyte membrane and generates power by using a fuel gas and an oxidizing agent gas, comprises a water tank 60 for the water that humidifies the fuel cell 1. The fuel system further comprises humidification judgment means (S120) for judging whether it is possible to humidify the fuel cell 1 by using the water in the water tank 60; and temperature control means (the controller 100) for controlling the temperature of the fuel cell 1. When it is judged by the humidification judgment means that the fuel cell 1 cannot be humidified, the operating temperature of the fuel cell 1 is limited to the limit temperature $T_{SOLIM}$ which is lower than the normal operating temperature, as shown in step S140. As a result, failure caused by a humidification shortage of the fuel cell 1 can be reduced when the humidification employing the water in the water tank 60 cannot be performed, and the time interval for obtaining the power generation amount required for vehicle travel can be shortened. As a result, it is possible to render a state in which water can be supplied from the water tank 60 by using the generated water or the heat accompanying the power generation of the fuel cell 1, and hence, even in a low temperature environment, futile consumption of fuel and electrical power can be suppressed, and the fuel cell can be efficiently started.

The humidification judgment means are water amount judgment means (S120) for judging whether the water in the water tank 60 is present in the liquid phase in an amount equal to or more than a predetermined value (Lw1), and, when liquid phase water is not present in an amount equal to or more than the predetermined value, the operating temperature of the fuel cell 1 is limited to below that during normal operation. As a result, the time interval until the fuel cell power generation amount required for vehicle travel is obtained can be shortened, and failure caused by a humidification shortage of the fuel cell can be prevented during the time interval up until the humidification water has accumulated, whereby a normal, highly efficient operation is enabled after the humidification water has been prepared.

The fuel cell system comprises the freezing prediction section 100a, which predicts whether there is a possibility of the water in the water tank 60 freezing; the shutoff valve 74, which discharges the water in the water tank 60; and the water level sensor 151, which detects the amount of water in the water tank 60. When it is predicted that there is a possibility of the water in the water tank 60 freezing, the water in the water tank 60 is discharged, and the operating temperature of the fuel cell 1 is limited to below that during normal operation until the water in the water tank 60 has accumulated in an amount equal to or more than a predetermined amount Lw1. As a result, with a system that is capable of ensuring the reliability of parts when water freezes, the supply of water is not necessary during startup. This is especially effective when a moving body, has a vehicle, is used.

The fuel cell system comprises the coolant pump 52, which pressure-feeds the coolant for performing a heat exchange with the fuel cell 1, and the radiator 50, as fuel cell temperature control means. When the temperature of the fuel cell 1 is limited to below that during normal operation, the coolant flow rate circulated in the radiator 50 is maximized when this temperature is the limit temperature $T_{SOLIM}$ whereby the temperature of the coolant discharged by the fuel cell 1 is limited. In other words, the proportion of coolant circulated in the cooling loop by the three-way valve 53 is maximized when $T_{so}$ is less than $T_{SOUPR}$ and in the vicinity thereof. In addition, the discharge amount is maximized by the coolant pump 52.

As a result, temperature control of the fuel cell 1 can be accurately performed, and failure caused by a humidification shortage of the fuel cell 1 can be viably prevented.

The fuel cell system further comprises output limit means (S220) for limiting the output of the fuel cell 1, as fuel cell temperature control means. It is thus possible to reliably limit the temperature of the fuel cell 1 also in a situation where the external temperature $T_{ATM}$ is high and temperature limitation is difficult, and, as a result, in the case of a broader environment, failure caused by a humidification shortage of the fuel cell 1 is reliably prevented and an efficient operation can be executed.

When the operating temperature of the fuel cell 1 is limited, the output Pw of the fuel cell 1 is limited in a case where the operating temperature of the fuel cell 1 exceeds the limit temperature $T_{SOUPR}$ after the coolant environment flow rate to the radiator 50 has reached a maximum as a result of preferentially increasing the coolant flow rate to the radiator 50. As a result, the circumstances in which it is necessary to limit the output of the fuel cell 1 can be diminished, and a condition where it is not possible to accelerate as per the driver's intentions can be minimized.

In addition, in a case where the temperature of the fuel cell 1 is limited to below that during normal operation, the motive power of the radiator fan 50a is maximized when the temperature of the coolant discharge by the fuel cell 1 is the limit temperature $T_{SOLIM}$. It is thus possible to accurately control the temperature of the fuel cell 1 and reliably prevent failure caused by a humidification shortage of the fuel cell 1.

Here also, when the operating temperature of the fuel cell 1 is limited, the output Pw of the fuel cell 1 is limited in a case where the operating temperature of the fuel cell 1 exceeds the limit temperature $T_{SOLIM}$ after the motive power of the radiator 50a has reached a maximum as a result of preferentially increasing the motive power of the radiator 50a. As a result, the circumstances in which it is necessary to limit the output of the fuel cell 1 can be further diminished, and the condition where it is not possible to accelerate as per the operator's intentions can be minimized.

Furthermore, the fuel cell system of the first embodiment comprises pressure regulating means (PCV 18, 43) for regulating the operating pressure of the fuel cell. When it is judged by the humidification judgment means (S120) that the fuel cell 1 cannot be humidified, the operating pressure of the fuel cell 1 is increased. Here, a reference map for when there is a water shortage at a large set pressure as shown in FIG. 14 is used. Since the generated water that is generated by the power generation is therefore not readily withdrawn along with the cathode discharge gas, a humidification shortage of the fuel cell 1 can be more effectively prevented and the humidification water can be accumulated sooner.

More specifically, when it is judged that the fuel cell 1 cannot be humidified by the humidification judgment means, the pressure of the fuel cell 1 is increased together with the rise in the operating temperature of the fuel cell 1, such that the fuel cell 1 operates at a maximum pressure upon reaching the temperature at which the temperature of the fuel cell 1 is limited. Accordingly, the fuel cell 1 operates at the maximum pressure $P_{OMAX}$ in the state of the limit temperature $T_{SOLIM}$, and a humidification shortage of the fuel cell 1 can be prevented at the maximum of the system capacity.

Further, in this embodiment, the WRD 21 is provided as a basic humidification device, and a humidification shortage does not readily occur outside the high temperature strict operating conditions. Accordingly, humidification by the WRD 21 can be performed to a certain extent even at startup at low temperatures, and the moisture retention of the electrolyte can be maintained adequately simply through minimal limitation of the operating temperature of the fuel cell 1 to the extent that auxiliary humidification is not required.

Second Embodiment

Figure 18:
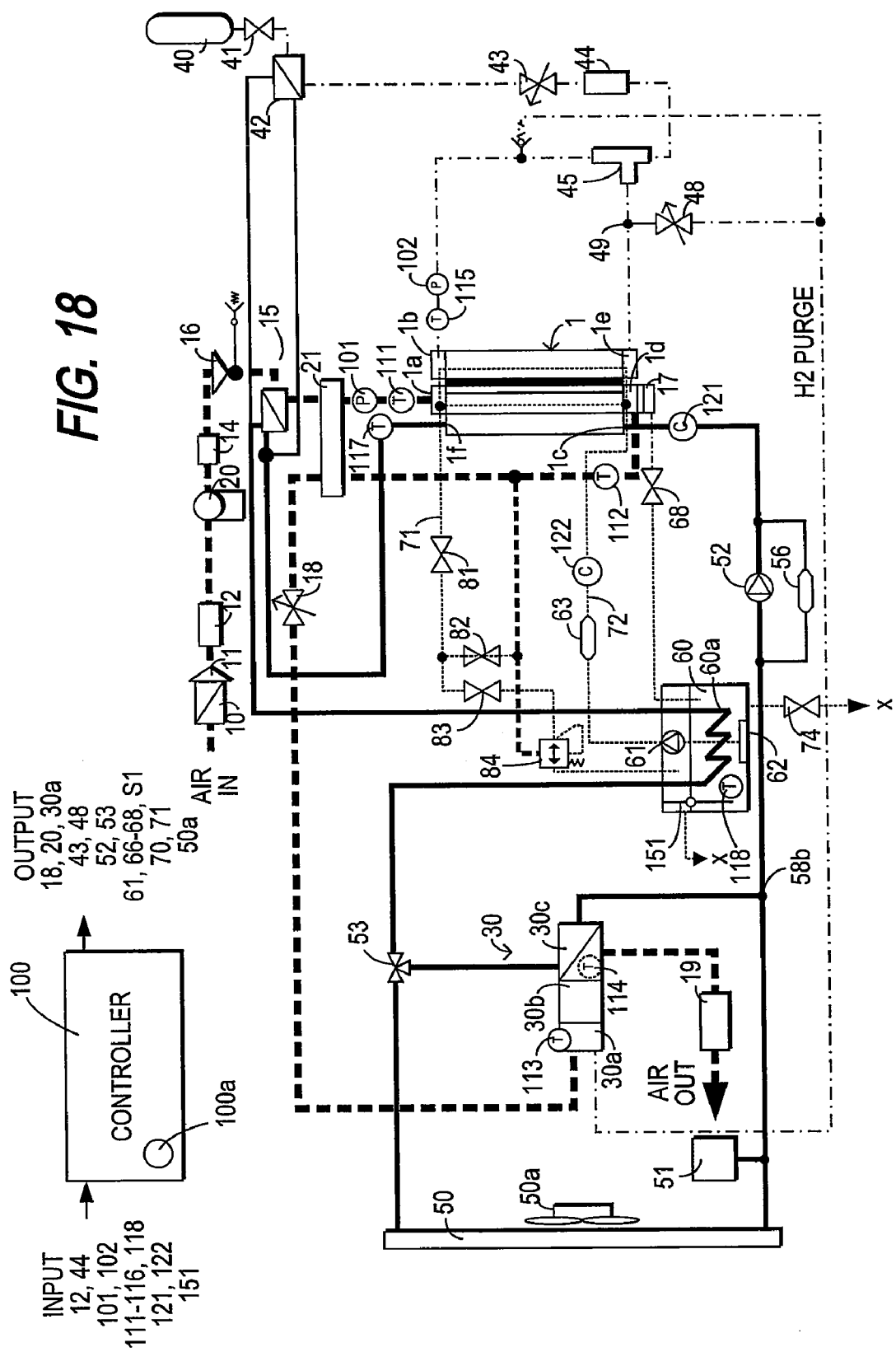
FIG. 18 is similar to FIG. 1, being a constitutional view of the fuel cell system of a second embodiment.

The second embodiment will now be described. The constitution of the fuel cell system will be descried with reference to FIG. 18. Here, a fuel cell system that stores purified water in the water tank 60 also during system stoppage and performs thawing at low power when the stored purified water is freezing will be described. The focus of the description below will be on the parts which differ from those of the first embodiment.

First of all, an oxidizing agent system that supplies and charges air to and from the cathode will be described.

The oxidizing agent system comprises an air cleaner 10, a chemical filter 11, and a flow meter 12, and the downstream side of this oxidizing agent system and the intake side of the compressor 20 are connected. A silencer 14, microfilter 16, and an air temperature regulator 15 are provided on the discharge side of the compressor 20. In addition, the cathode inlet manifold 1a of the fuel cell 1 is connected to them via the humidified side of the WRD 21 which uses cathode discharge gas as the humidification source. A pressure sensor 101 and an air sensor 111 are provided between the WRD 21 and the fuel cell 1. Downstream from the cathode outlet manifold 1d of the fuel cell 1, the constitution is the same as that of the first embodiment. However, in the second embodiment, the water of the water separator 17 that is provided at the cathode outlet manifold 1d is all sent to the water tank 60, and hence the shutoff valve 69 is not provided.

Next, a hydrogen system that supplies and discharges hydrogen gas to and from the anode will be described.

The hydrogen temperature regulator 42 is connected to the hydrogen tank 40 via the shutoff valve 41. In addition, an injector 45 is connected via the pressure control valve PCV 43 and the flow meter 44. A connection is made from the injector 45 to the anode inlet manifold 1b of the fuel cell 1, and the pressure sensor 102 and temperature sensor 115, which detect the pressure and temperature respectively of the hydrogen supplied to the fuel cell 1, are provided on the upstream side of the injector 45. A hydrogen circulation path is formed between the anode outlet manifold 1e and the injector 45. A branched channel that extends from the branched portion 49, which is provided between the anode outlet manifold 1e and the injector 45, to the combustion device 30 is formed and regulates the flow rate of anode discharge gas that is diverted to the combustion device 30 by the flow rate control valve FCV 48. The other parts of the hydrogen system are constituted in the same way as in the first embodiment.

Next, a cooling system that controls the temperature of the fuel cell 1 will be described.

The coolant reserve tank 51 is connected to the inlet side of the coolant pump 52. The discharge side of the coolant pump 52 is connected to the coolant inlet manifold 1c of the fuel cell 1 via the conductance meter 121. The temperature sensor 117, which detects the coolant outlet temperature $T_{SO}$ of the coolant that is discharged by the fuel cell 1, is provided on the downstream side of the coolant outlet manifold 1f. In addition, on the downstream side, the circuit divides into the air temperature regulator 15 and the hydrogen temperature regulator 42 and heat is exchanged with the air and hydrogen gas before confluence reoccurs. Thereafter, the cooling passes through the water tank 60. The piping of the cooling system disposed in the water tank 60 is a heat an portion 60a, and heat takes place with the water stored in the water tank 60 when the coolant flows through the heat exchange portion 60a. As a result, when the water in the water tank 60 is freezing, for example, the heat from the coolant of a comparatively high temperature is supplied to the water to make it possible to promote thawing of the water in the water tank 60. The coolant that has been circulated in the heat portion 60a is then connected to the three-way valve 53 that splits [the circuit] into the radiator 50 and the combustion device 30. The three-way valve 53 provides a division into a warming-up loop and a cooling loop as in the first embodiment to regulate the temperature of the coolant. The warming-up loop and the cooling loop are connected by an interflow portion 58b and connected to the inlet side of the water pump 52. The ion filter 56, which reduces the conductance of the coolant, is provided in parallel with the water pump 52.

Next, a purified water system that performs humidification of the fuel cell 1 will be described.

The water tank 60 contains the water level sensor 151, the water pump 61, and the stainer 62 at the intake of the water pump 61. On the discharge side of the water pump 61, the discharge path 72, which is connected to the fuel cell 1 via the conductance meter 122 and the ion filter 63, is provide. Within the fuel cell 1, an anode and a cathode, and a water channel via a porous plate are provided. When the purified water passes through the water channel, humidification is performed by supplying moisture to each electrode and the electrolyte film via the porous plate. In other words, in this embodiment the WRD 21 is used as the main humidification means and humidification is performed by means of the purified water that circulates in the fuel cell 1 that constitutes auxiliary humidification means.

The return path 71 that returns the purified water which is not used in the humidification of the fuel cell 1 to the water tank 60 is provided with a shutoff valve 81, a shutoff valve 83, and a pressure control valve PRV 84. The PRV 84 uses the cathode outlet pressure of the fuel cell 1 as a reference pressure. A path that is connected to the cathode discharge gas side via a shutoff valve 82 is formed between the shutoff valve 81 and the shutoff valve 83. By opening the shutoff valve 82, the shutoff valve 81, and the shutoff valve 83, the water in the circuit is returned to the water tank 60 by means of the cathode discharge gas. This water circuit and the parts in the water circuit can be heated by a heat source such as an electric heater (not shown).

During shutdown, after power generation has stopped, the compressor 20 is driven under electrical power from a secondary cell (not shown). By slightly increasing the cathode pressure by means of the PCV 18, the water in the water separator 17 is returned to the water tank 60. Once the drainage within the cathode outlet manifold 1d is complete, the shutoff valve 68 is closed to retain the drained state within the manifold 1d. Further, the shutoff valves 81 to 83 are opened for drainage from the discharge path 72 and the return path 71. Freezing of the purified water within the piping is thus prevented.

Figure 19:
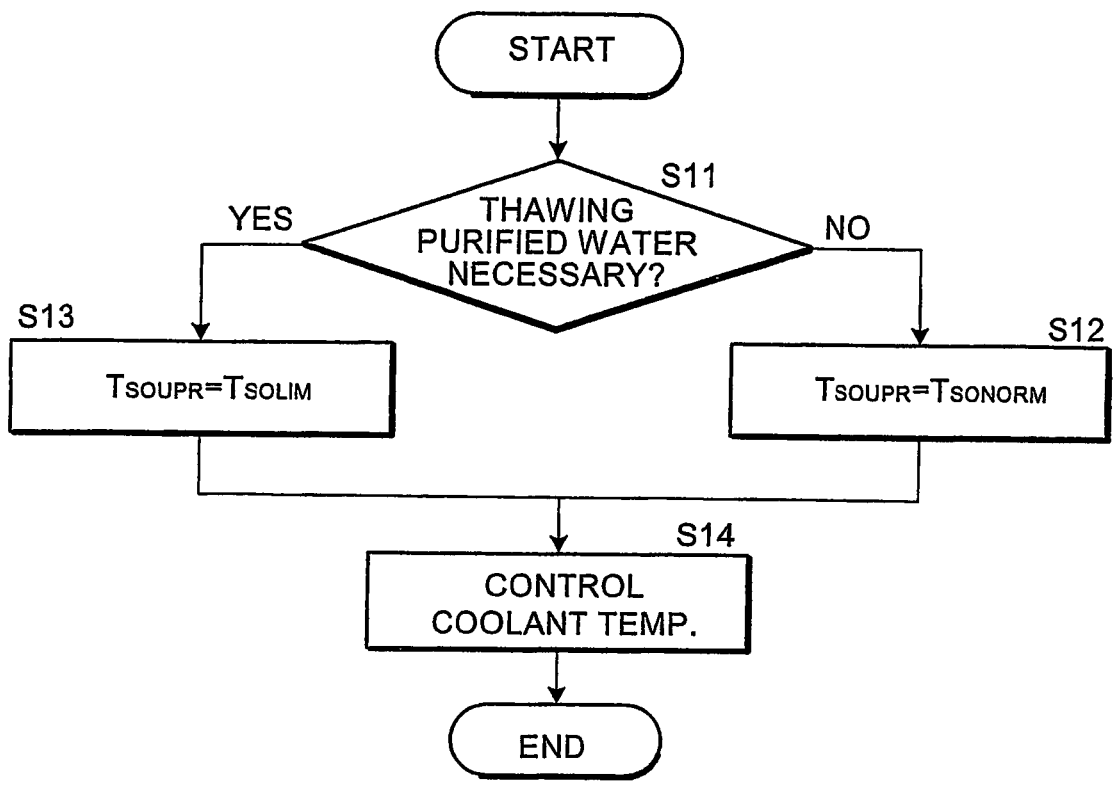
FIG. 19 is a flowchart showing an outline of the temperature control of the fuel cell of the second embodiment.

Next, fuel cell temperature control at startup will be described. An outline of the control will be described with reference to FIG. 19. First of all, a command to commence startup is detected, and the processing shown in FIG. 19 is started once the fuel cell 1 has undergone a rise in temperature as far as the temperature $T_S$ that permits generation of the electrical power required for a vehicle start.

In step S11, it is judged whether the purified water in the water tank 60 needs to be thawed. This can be judged from the output of the temperature sensor 118 provided in the water tank 60. When the temperature Tw of the purified water in the water tank 60 is equal to or more than the predetermined temperature Tw1, the processing moves on to step S12, whereupon the coolant outlet target temperature $T_{SOUPR}$ is set to the normal temperature $T_{SONORM}$. On the other hand, when the purified water temperature Tw does not satisfy the predetermined temperature Tw1, the processing moves on to step S13, whereupon the coolant outlet target temperature $T_{SOUPR}$ is set to the limit temperature $T_{SOLIM}$. In the coolant temperature control of step S14, the cooling system is controlled in accordance with the coolant outlet target temperature $T_{SOUPR}$ thus set in step S12 or S13 and in accordance with the detected coolant outlet temperature $T_{SO}$. As a result, the temperature rise of the fuel cell 1 is suppressed when the water in the water tank 60 is freezing and the water for the humidification can be prepared and humidification using purified water started before dryout occurs due to a humidification shortage of the fuel cell 1.

The details of the control will be descried next. The focus of the following description will be on the parts which differ from those of the first embodiment.

The main routine of the temperature control at startup is the same as that of the first embodiment shown in FIG. 4. In step S30, it is judged whether the temperature of the fuel cell 1 has reached the temperature required in order to generate the electrical power required for a vehicle start. Here, it is judged whether the coolant outlet temperature $T_{SO}$ has reached $T_S(=0°C.)$. When $T_S$ has not been reached, a command prohibiting the start is output, and then fuel cell warming-up control is performed in step S50. However, when the coolant outlet temperature $T_{SO}$ has not reached $T_S$ in step S30, it is thought that the temperature of the atmosphere is below freezing and it can be judged that there is a possibility of the water in the water tank 60 freezing. Fuel cell warming-up control is performed as follows in consideration of this possibility.

Fuel cell warming-up control performs the combustion in the combustion device 30 by using a secondary cell or similar to increase the temperature of the circulated coolant. The temperature of the fuel cell 1 is raised by allowing the coolant, whose temperature has thus risen, to flow through the fuel cell 1. Because heat is efficiently exchanged between the fuel cell 1 and the coolant, the coolant temperature in the coolant outlet manifold 1f is at substantially the same level as that of the fuel cell 1.

In a case where the fuel cell 1 is well below freeing (−20° C., for example) and a large amount of power required for normal operation (an operating state permitting vehicle travel in this embodiment) is generated, generated water is cooled by the cooled fuel cell 1 and refreezes, and hence when the fuel cell 1 is not heated to close to 0° C., it is difficult to generate a large amount of electrical power. It is therefore not easy for the coolant outlet temperature $T_{SO}$ to equal or exceed freezing until a large amount of electrical power can be generated. As a result, coolant at or above freezing cannot enter the water tank 60 that is downstream of the fuel cell 1, and, hence, although heat can be applied to the ice a little at a time via the sure of the ice in the heat exchange portion within the water tank 60, a thawing of the frozen water is not achieved. Accordingly, very little heat is taken from the coolant in the water tank heat exchange portion 60a, and electrical power is not actively consumed in order to thaw the water tank 60. For this reason, efficient heating of the fuel cell 1 at close to freezing point can be implemented by using the amount of heat generated by the CAT 30b. When this is considered with the same hydrogen consumption amount, the above processing makes it possible to carry the fuel cell 1 over to a state enabling a large amount of power to be generated quickly, whereby the start time interval and start consumption energy can be reduced.

Figure 20:
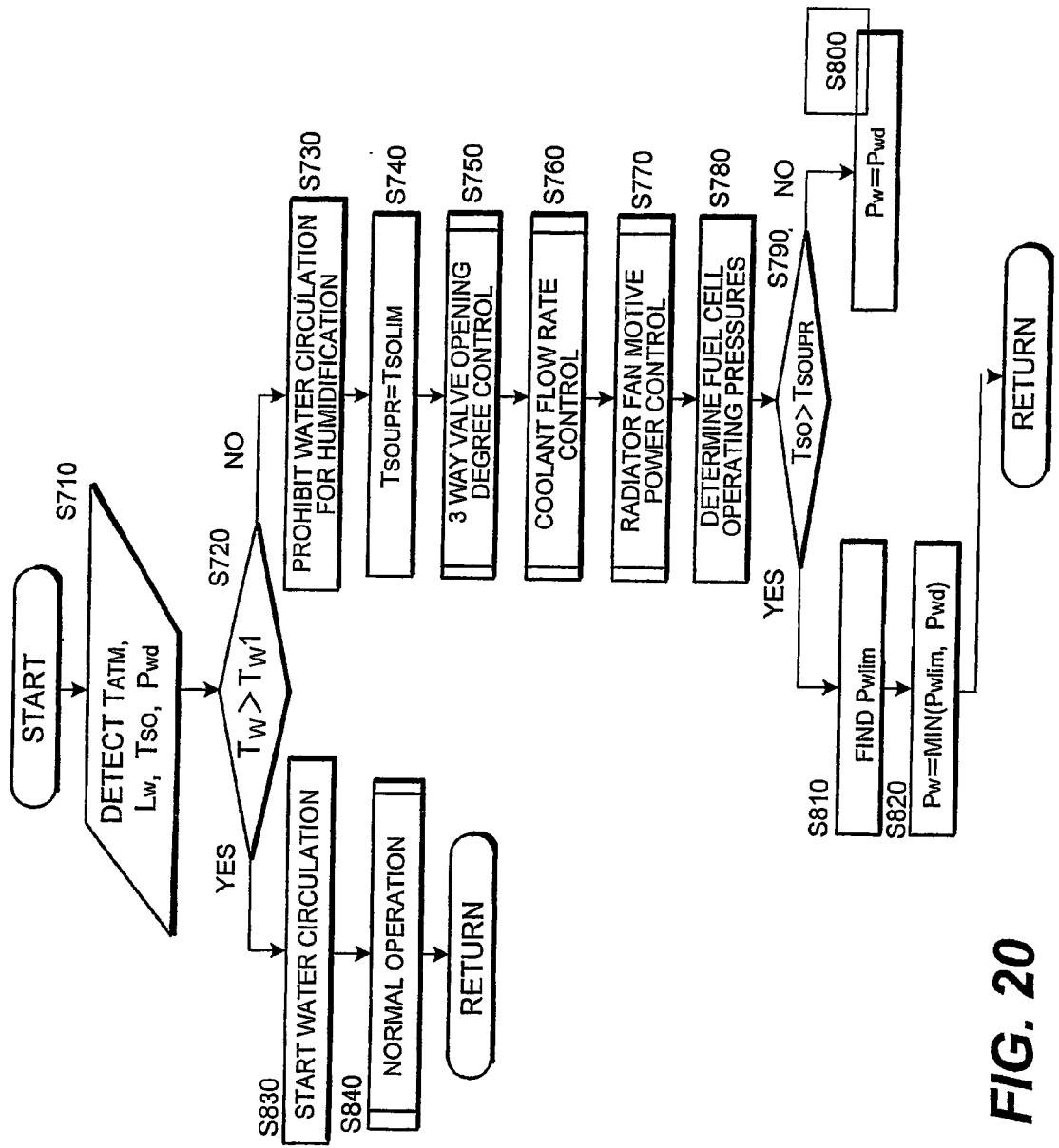
FIG. 20 is a flowchart of the cooling system control during a vehicle start according to this second embodiment.

Thereafter, when the fuel cell 1 reaches a temperature permitting power generation, the operation of the CAT 30b is stopped to terminate the warming-up operation. That is, when it is judged in step S30 that $T_{SO}>T_S$, processing moves on to step S60 to perform start control. Then, the purified water in the water tank 60 is thawed by using the heat generated by the power generation of the fuel cell 1. The start control of this embodiment is shown in FIG. 20.

In this embodiment, the decision on whether to commence normal operation is judged according to the temperature Tw of the water accumulated in the water tank 60 rather than by the water level Lw of the water tank 60. Here, the judgment is made in accordance with the output of the temperature sensor 118 provided in the water tank 60. That is, in step S720, it is judged whether it is possible to perform humidification by using the water in the water tank 60 on the basis of whether the temperature Tw of the water in the water tank 60 is higher than the predetermined temperature Tw1. The predetermined temperature Tw1 is the temperature at which it can be judged that a predetermined amount of the water in the water tank 60 has thawed. Here, this is an amount which permits circulation by the water pump 61. The predetermined temperature Tw1 is preset close to 0° C., for example.

In step S720, if Tw≦Tw1, it can be judged that thawing has not taken place to an extent permitting water circulation, and hence the control of steps S730 to S820 is performed. These steps are the same control as that of steps S130 to S220 of the first embodiment. As a result of this control, heat exchange take place between the fuel cell 1 and the coolant that is set at a low temperature, and then the heated coolant is allowed to pass through the heat exchange portion 60a of the water tank 60. The water in the water tank 60 can thus be thawed by using the heat accompanying the power generation of the fuel cell 1. Accordingly, the fuel consumed can also be reduced by using the CAT 30b to thaw the water in the water tank 60.

Until it is judged that the temperature Tw of the water tank 60 exceeds 0° C. and that humidification by means of the water in the water tank 60 is possible, limitation of a temperature excess above the temperature permitting operation is performed without humidification of the fuel cell 1. The fuel cell 1 can thus be permitted to operate without drying out due to a water shortage until the water tank 60 has thawed, whereby an efficient start can be made.

Figure 21:
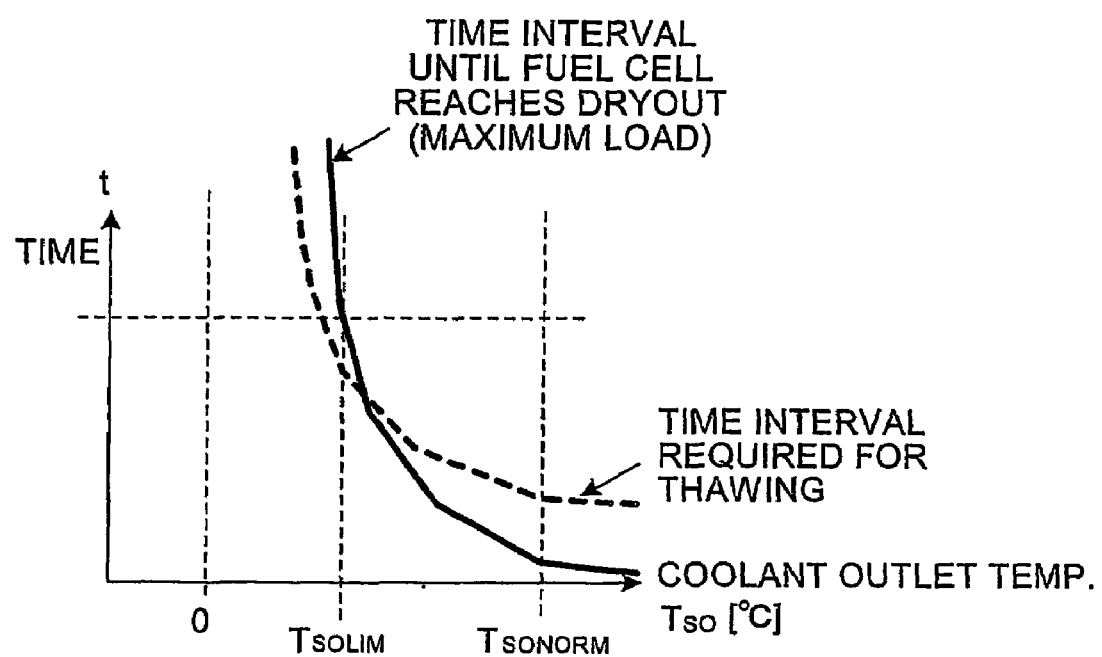
FIG. 21 is a table specifying the relationship between the time interval up until dryout with respect to the coolant outlet temperature and the time interval required for thawing with respect to the coolant outlet temperature.

Further, when the coolant outlet target temperature $T_{SOUPR}$ $(=T_{SOLIM})$ when the operating temperature is limited is set in step S740, $T_{SOLIM}$ is set on the basis of the relationship of the time interval required for thawing with respect to the coolant output temperature shown in FIG. 21 rather than FIG. 6. The time interval required for thawing corresponds to the time interval until water accumulation of the first embodiment.

On the other hand, when it is judged in step S720 that Tw>Tw1, the processing moves on to steps S830 and S840, and normal operation is started in the same way as in steps S230 and S240 of the first embodiment by operating the water pump 61.

Figure 22:
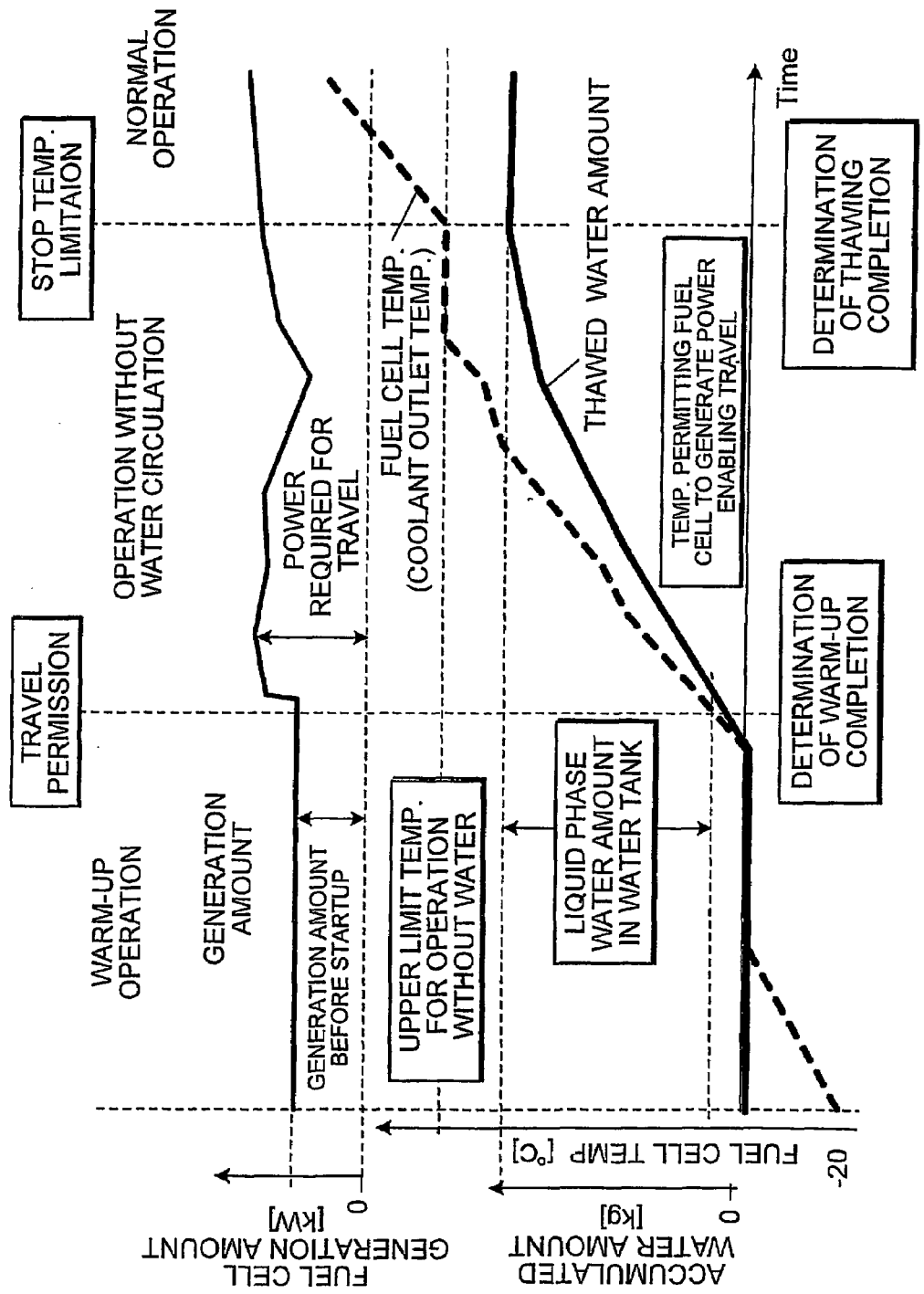
FIG. 22 is a timing chart that shows the variation in the fuel cell temperature and thawed water amount according to the second embodiment.

As a result of the above-described control, the variation in the time interval for the temperature of the fuel cell 1 and the amount of thawed water are shown in FIG. 22.

Warming-up of the fuel cell 1 is performed by raising the temperature of the coolant in the combustion device 30 during the warming-up operation. When the fuel cell 1 has been warmed up to the temperature $T_S$ (close to 0° C.) that prevents freezing and enables a large amount of electrical power to be generated, combustion of the combustion device 30 is stopped and power is actively generated to start vehicle travel. The temperature of the fuel cell 1 rises in accordance with this power generation. Since the coolant temperature rises, thawing within the water tank 60 is performed by passing the coolant through the heat exchange portion 60a in the water tank 60. The operation takes place without humidification of the fuel cell 1 by the purified water system, and, therefore, when the temperature of the fuel cell 1 rises excessively, there is a possibility that a water shortage will occur and that the fuel cell 1 will deteriorate. Therefore, the cooling capacity of the cooling system is increased by increasing the coolant flow rate, the proportion of coolant circulated in the radiator 50, and the cooling capacity of the radiator 50. In addition, a water shortage of the fuel cell 1 is further suppressed by increasing the operating pressure. In addition, when temperature suppression is required, deterioration of the fuel cell 1 is suppressed by limiting the output of the fuel cell 1.

As a result, it is possible to prevent the temperature of the fuel cell 1 from exceeding the target temperature $T_{SOUPR}$ while regulating the temperature of the fuel cell 1 such that the required output is readily generated. Thawing within the water tank 60 is continued by maintaining this state, and, once the thawed amount exceeds a predetermined amount, which is an amount permitting circulation by the water pump 61 here, normal operation is started.

Next, the effects of this embodiment will be described. Only the effects which differ from those of the first embodiment will be described here.

Thawing means (the heat exchange portion 60a), which thaw the freezing in the water tank 60, and the temperature sensor 118 that detects the state of the water in the water tank 60, are provided. Freezing judgment means (S720), which judge whether water of at least a predetermined amount is in the liquid phase in the water tank 60, are used as the humidification judgment means. Once it has been judged that the water in the water tank 60 is freezing, and that the liquid-phase water does not satisfy the predetermined amount, the operating temperature of the fuel cell 1 is limited to a limit temperature $T_{SOLIM}$ below that for normal operation. In addition, when it is judged that water of at least the predetermined amount is in the liquid phase in the water tank 60, the limitation of the operating temperature of the fuel cell 1 is canceled. As a result, failure caused by a humidification shortage of the fuel cell 1 while the humidification water is freezing can be prevented, the time interval for obtaining the power generation amount required for vehicle travel can be shortened, and the energy for preparing the humidification water can be minimized. Thereafter, once the humidification water has been prepared, normal highly efficient operation is possible.

The temperature sensor 118 for sensing the temperature of the water in the water tank 60 is provided as state detection means for detecting the state of the water in the water tank 60, such that, when the temperature of the water in the water tank 60 is at a predetermined temperature Tw1 that exceeds 0° C., it is judged that water of a predetermined amount or more is in the liquid phase in the water tank 60. The thawed state of the water tank 60 can thus be sensed, and hence it is possible to reliably judge whether humidification water can be circulated. Accordingly, damage to the circulation system parts of the purified water system as a result of starting water circulation while the frozen state still prevails can be prevented.

The combustion device 30, which burns a hydrogen-containing gas and an iodizing agent gas, is provided, and a cooling system, which performs heat exchange with the coolant by causing the coolant to be circulated in the combustion device 30, the fuel cell 1, and the water tank 60 in that order, is provided as fuel cell temperature control means. When warming up the fuel cell 1, the heat generated in the combustion device 30 is supplied to the fuel cell 1 via the coolant, and then, after the warming-up of the fuel cell 1 is complete and the combustion device 30 has been stopped, the water tank 60 is warmed up by supplying the heat that accompanies the power generation of the fuel cell 1 to the water tank 60 via the coolant.

The time interval up until the power generation that enables travel is performed by the fuel cell 1 can be shortened by warming up only the fuel cell 1 by means of the combustion device 30. In addition, because thawing of the water in the water tank 60 is performed by stopping combustion after warming up the fuel cell 1 to an extent permitting power generation and then using the waste heat from the fuel cell 1, thawing of favorable fuel efficiency can be performed. Since the cooling system and operating pressure, and, where required, the operating output can be regulated, a temperature range in which dryout does not occur even in the absence of a humidification operation can be established for the fuel cell 1.

When it is judged that the fuel cell 1 cannot be humidified by the humidification judgment means (S720), the operating pressure of the fuel cell 1 is increased. Here, the reference map shown in FIG. 14 for when there is a water shortage with a large set pressure is used. As a result, a humidification shortage of the fuel cell 1 can be more efficiently prevented and, more particularly the limit operation temperature of the fuel cell 1 can be set high. In a case where ice in the water tank 60 is thawed by using the heat of the coolant, the thawing time interval can be shortened further by means of high temperature coolant and the humidification water can be prepared in a short time.

Moreover, it goes without saying that this does not limit this invention to the above-described embodiments, rather a variety of modifications are feasible within the range of the technological ideas appearing in the claims.

The entire contents of Japanese Patent Application P2002-351174 (filed Dec. 3, 2002) are incorporated herein by reference.

Although the invention has been described above by reference to certain embodiments of the invention, the invention is not limited to the embodiments described above. Modifications and variations of the embodiments described above will occur to those skilled in the art in the light of the above teachings. The scope of the invention is defined with reference to the follow claims.

INDUSTRIAL APPLICABILITY

According to this invention, a rapid start is permitted while failure caused by a humidification shortage of the fuel cell is prevented even in a low temperature environment in which there is a possibility of water in the fuel cell system freezing, and this is therefore beneficial in a broadening of the permissible range of applications of the fuel cell system. Further, although the system was applied to a vehicle in the description of the above embodiments, this invention can naturally also be applied to fuel cell systems other than vehicle fuel cell systems.

The invention claimed is:

1. A fuel cell system, comprising:
a fuel cell that has an electrolyte membrane and generates power by using a fuel gas and an oxidizing agent gas;
a storage device for water that humidifies the fuel cell, and
a controller that functions to:
judge whether the fuel cell can be humidified by using the water of the storage device, and
limit the operating temperature of the fuel cell to below a limit temperature that is lower than during normal operation in a case where it is judged that the fuel cell cannot be humidified.

2. The fuel cell system as defined in claim 1,
wherein the controller further functions to:
judge whether the water in the storage device is present in the liquid phase in a predetermined amount or more, and
limit the operating temperature of the fuel cell to below the limit temperature in a case where the liquid-phase water is not present in the predetermined amount or more.

3. The fuel cell system as defined in claim 1, further comprising:
a thawing device that thaws freezing water in the storage device; and
a detection device that detects the state of the water in the storage device,
wherein the controller further functions to:
judge whether water of at least a predetermined amount is in the liquid phase in the storage device, and
limit the operating temperature of the fuel cell to below the limit temperature in a case where the water in the storage device is freezing and it is judged that the liquid-phase water does not satisfy the predetermined amount, and
cancel the limit on the operating temperature of the fuel cell upon judging that water of at least the predetermined amount is in the liquid phase in the storage device.

4. The fuel cell system as defined in claim 2, further comprising:
a discharge device for discharging the water in the storage device; and
a water amount detection device that detects the amount of water in the storage device,
wherein the controller further functions to:
predict whether there is a possibility of the water in the storage device freezing,
discharge the water in the storage device in a case where it is judged that there is a possibility of the water in the storage device freezing, and
limit the operating temperature of the fuel cell at startup of the fuel cell to below the limit temperature until water in the storage device has accumulated in the predetermined amount or more.

5. The fuel cell system as defined in claim 1, further comprising:
a cooling system having a coolant pump that pressure-feeds a coolant that exchanges heat with the fuel cell and a radiator that performs coolant heat radiation,
wherein the controller further functions to:
maximize the coolant flow rate circulated in the radiator when the temperature of the coolant discharged by the fuel cell is the limit temperature, in a case where the temperature of the fuel cell is limited to below the limit temperature.

6. The fuel cell system as defined in claim 5, wherein the controller further functions to:
control the temperature of the fuel cell by limiting the output of the fuel cell.

7. The fuel cell system as defined in claim 6, wherein the controller further functions to:
preferentially increase the coolant flow rate to the radiator when the operating temperature of the fuel cell is limited, and
limit the output of the fuel cell in a case where the operating temperature of the fuel cell also exceeds the limit temperature after the coolant circulation flow rate to the radiator has reached a maximum.

8. The fuel cell system as defined in claim 6, further comprising:
a radiator fan that increases and decreases the flow rate of an air stream that passes through the radiator,
wherein the controller further functions to:
preferentially increase the motive power of the radiator fan when the operating temperature of the fuel cell is limited, and
limit the output of the fuel cell in a case where the operating temperature of the fuel cell also exceeds the limit temperature after the motive power of the radiator fan has reached a maximum.

9. The fuel cell system as defined in claim 6, further comprising:
a radiator fan that increases and decreases the flow rate of an air stream that passes through the radiator,
wherein the controller further functions to:
limit the output of the fuel cell in a case where the fuel cell also exceeds the limit temperature after the coolant flow rate to the radiator and the motive power of the radiator fan have both reached a maximum, when the operating temperature of the fuel cell is limited.

10. The fuel cell system as defined in claim 3, further comprising:
a water temperature detection device that senses the temperature of the water in the storage device,
wherein the controller further functions to:
judge that water of a predetermined amount or more in the storage device is in the liquid phase in a case where the temperature of the water in the storage device is at a predetermined temperature that exceeds 0° C.

11. The fuel cell system as defined in claim 1, further comprising:
a pressure regulation device that regulates the operating pressure of the fuel cell,
wherein the controller further functions to:
increase the operating pressure of the fuel cell in a case where it is judged that the fuel cell cannot be humidified.

12. The fuel cell system as defined in claim 11, wherein the controller further functions to:
increase the operating pressure of the fuel cell in accordance with a rise in the operating temperature of the fuel cell in a case where it is judged that the fuel cell cannot be humidified, and operate the fuel cell at maximum pressure when the temperature of the fuel cell has reached the limit temperature.

13. The fuel cell system as defined in claim 3, further comprising:
a combustion device that burns a hydrogen-containing gas and an oxidizing agent gas; and
a cooling system that circulates a coolant in the combustion device, the fuel cell, and the storage device in that order,
wherein the controller further functions to:
supply the heat generated by the combustion device to the fuel cell via the coolant when warming up the fuel cell, and
warm up the storage device by supplying the heat that accompanies the power generation of the fuel cell to the storage device via the coolant after the warming-up of the fuel cell is complete and the combustion device has been stopped.

14. A startup method for a fuel cell system that comprises a fuel cell that has an electrolyte membrane and generates power by using a fuel gas and an oxidizing agent gas; and a storage device for water that humidifies the fuel cell, said method comprising:

judging whether the fuel cell can be humidified by using the water of the storage device, and limiting the operating temperature of the fuel cell to below a limit temperature that is lower than during normal operation in a case where it is judged that the fuel cell cannot be humidified.

* * * * *